(12) United States Patent
Lim et al.

(10) Patent No.: US 9,094,666 B2
(45) Date of Patent: *Jul. 28, 2015

(54) PICTURE ENCODING METHOD AND PICTURE DECODING METHOD

(71) Applicant: Panasonic Intellectual Property Corporation of America, Torrance, CA (US)

(72) Inventors: Chong Soon Lim, Singapore (SG); Teck Wee Foo, Singapore (SG); Sheng Mei Shen, Singapore (SG); Shinya Kadono, Hyogo (JP); Satoshi Kondo, Kyoto (JP); Makoto Hagai, Osaka (JP); Kiyofumi Abe, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/156,659

(22) Filed: Jan. 16, 2014

(65) Prior Publication Data

US 2014/0133577 A1 May 15, 2014

Related U.S. Application Data

(60) Division of application No. 13/461,237, filed on May 1, 2012, now Pat. No. 8,660,192, which is a continuation of application No. 11/976,272, filed on Oct. 23, 2007, now Pat. No. 8,189,680, which is a (Continued)

(30) Foreign Application Priority Data

| | | | |
|---|---|---|---|
| Jul. 11, 2002 | (JP) | | 2002-202781 |
| Jul. 17, 2002 | (JP) | | 2002-207681 |
| Jan. 14, 2003 | (JP) | | 2003-006198 |

(51) Int. Cl.
*H04N 7/12* (2006.01)
*H04N 11/02* (2006.01)

(Continued)

(52) U.S. Cl.
CPC ....... *H04N 19/00569* (2013.01); *H04N 19/423* (2014.11); *H04N 19/44* (2014.11);

(Continued)

(58) Field of Classification Search
CPC .................. H04N 19/00484; H04N 19/00781; H04N 21/44004
USPC ........................................ 375/240.25, 240.12
See application file for complete search history.

(56) References Cited

U.S. PATENT DOCUMENTS

| | | |
|---|---|---|
| 5,398,072 A | 3/1995 | Auld |
| 5,724,446 A | 3/1998 | Liu et al. |

(Continued)

FOREIGN PATENT DOCUMENTS

| | | |
|---|---|---|
| EP | 0 542 195 | 11/1992 |
| EP | 0 729 276 A2 | 8/1996 |

(Continued)

OTHER PUBLICATIONS

International Search Report issued Oct. 28, 2003 in International Application No. PCT/JP03/08576.

(Continued)

*Primary Examiner* — Nhon Diep
(74) *Attorney, Agent, or Firm* — Wenderoth, Lind & Ponack, L.L.P.

(57) ABSTRACT

A picture encoding method of the present invention is a picture encoding method of predictively encoding an input picture with reference to pictures stored in a picture buffer, decoding the encoded input picture, judging whether or not the decoded picture is a picture for reference and whether or not the decoded picture is a picture for output which needs to be stored until its display time, and storing, in the picture buffer, the picture for reference and the picture for output based on the determination result.

1 Claim, 28 Drawing Sheets

Related U.S. Application Data continuation of application No. 11/605,958, filed on Nov. 30, 2006, now Pat. No. 7,995,658, which is a division of application No. 10/481,012, filed as application No. PCT/JP03/08576 on Jul. 7, 2003, now Pat. No. 7,206,347.

(51) Int. Cl.

| | | |
|---|---|---|
| H04N 11/04 | (2006.01) | |
| H04N 19/50 | (2014.01) | |
| H04N 21/234 | (2011.01) | |
| H04N 21/44 | (2011.01) | |
| H04N 19/70 | (2014.01) | |
| H04N 19/51 | (2014.01) | |
| H04N 19/61 | (2014.01) | |
| H04N 19/44 | (2014.01) | |
| H04N 19/423 | (2014.01) | |
| H04N 19/55 | (2014.01) | |
| H04N 19/577 | (2014.01) | |

(52) U.S. Cl.
CPC .............. *H04N 19/50* (2014.11); *H04N 19/51* (2014.11); *H04N 19/55* (2014.11); *H04N 19/577* (2014.11); *H04N 19/61* (2014.11); *H04N 19/70* (2014.11); *H04N 21/23406* (2013.01); *H04N 21/44004* (2013.01)

(56) References Cited

U.S. PATENT DOCUMENTS

| | | | |
|---|---|---|---|
| 5,729,303 | A | 3/1998 | Oku et al. |
| 5,892,882 | A | 4/1999 | Kuroda et al. |
| 5,909,224 | A | 6/1999 | Fung |
| 5,936,670 | A | 8/1999 | Frencken |
| 5,974,224 | A | 10/1999 | Nagata |
| 6,002,438 | A | 12/1999 | Hocevar et al. |
| 6,009,231 | A | 12/1999 | Aoki et al. |
| 6,104,752 | A | 8/2000 | Yamagishi |
| 6,111,915 | A | 8/2000 | Fukunaga et al. |
| 6,181,746 | B1 | 1/2001 | Hoshi |
| 6,243,140 | B1 | 6/2001 | Suzuki |
| 6,271,774 | B1 | 8/2001 | Kato |
| 6,295,321 | B1 | 9/2001 | Lyu |
| 6,490,324 | B1 | 12/2002 | McDade et al. |
| 6,628,719 | B1 | 9/2003 | Kono et al. |
| 6,714,681 | B1 | 3/2004 | Nakamura |
| 6,836,273 | B1 | 12/2004 | Kadono |
| 6,904,093 | B1 | 6/2005 | Ko |
| 2001/0012402 | A1 | 8/2001 | Ozaki |
| 2001/0048805 | A1 | 12/2001 | Adolph et al. |
| 2002/0001458 | A1 | 1/2002 | Abelard et al. |
| 2002/0172284 | A1 | 11/2002 | Peng et al. |
| 2003/0012284 | A1 | 1/2003 | Kazayama et al. |
| 2004/0076236 | A1 | 4/2004 | Duruoz et al. |
| 2004/0213551 | A1 | 10/2004 | Noh et al. |
| 2004/0264570 | A1 | 12/2004 | Kondo et al. |

FOREIGN PATENT DOCUMENTS

| | | |
|---|---|---|
| EP | 0 730 376 | 9/1996 |
| EP | 0 868 086 | 11/1997 |
| EP | 0 982 948 | 3/2000 |
| EP | 1 011 270 A2 | 6/2000 |
| JP | 5-328329 | 12/1993 |
| JP | 6-38197 | 2/1994 |
| JP | 10-13791 | 1/1998 |
| JP | 10-13841 | 1/1998 |
| JP | 10-013841 | 1/1998 |
| JP | 10-224805 | 8/1998 |
| JP | 10-229563 | 8/1998 |
| JP | 10-257499 | 9/1998 |
| JP | 10-271507 | 10/1998 |
| JP | 10-322643 | 12/1998 |
| JP | 11-41605 | 2/1999 |
| JP | 2000-50272 | 2/2000 |
| JP | 2000-59794 | 2/2000 |
| JP | 2000-324484 | 11/2000 |
| JP | 2001-94941 | 6/2001 |
| JP | 2001-223987 | 8/2001 |
| JP | 2003-274412 | 9/2003 |
| TW | 257848 | 9/1995 |
| WO | 97/04598 | 2/1997 |
| WO | 99/34605 | 7/1999 |
| WO | 00/11612 | 3/2000 |
| WO | 01/69935 | 9/2001 |
| WO | 02/51162 | 6/2002 |

OTHER PUBLICATIONS

Supplementary European Search Report issued May 13, 2004 in European Application No. 03 74 1225.

Extended European Search Report issued Jan. 29, 2007 in European Application No. 06 12 2290.

Sullivan, G., entitled "Draft for H.263++ Annexes U, V, and W to Recommendation H.263", ITU-T H.263+++ Draft for H.263++ Annexes U, V and W to Recommendation H. 263, XX, XX, Nov. 20, 2000, pp. 1-46, XP000986538.

Text of Committee Draft of Joint Video Specification (ITU-T Rec. H-264 ISO/IEC 14496-10 AVC) MPEG02/N4810, ISO/IEC JTC1/SC29/WG11 MPEG02/N4810, Fairfax, U.S., May 2002, pp. I-X, 1-33, XP001074690.

Satoshi et al., Kondo, "Proposal for Minor Changes to Multi-Frame Buffering Syntax for Improving Coding Efficiency of B-pictures", ISO/IEC JTC1/SC29/WG11 and ITU-T SG16 Q.6, XX, XX, Jan. 29, 2002, Matsushita.

Fukunaga S. et al., "Error Resilient Video Coding by Dynamic Replacing of Reference Pictures", IEEE GLOBECOM 1996, vol. 3/3, Nov. 18, 1996, London, GB, pp. 1503-1508.

Office Action mailed on Nov. 16, 2007 in European Application No. 06 122 279.0.

M. Flierl and B. Girod, XP011099251 "Generalized B Pictures and the Draft H. 264/AVC Video-Compression Standard", IEEE Transactions on Circuits and Systems for Video Technology, vol. 13, No. 7, Jul. 2003.

M. Flierl and B. Girod, XP030003290 "Multihypothesis Prediction for B Frames", ITU-T SG 16/Q6 VCEG-N40, Sep. 2001.

Office Action issued May 30, 2008 in European Application No. 06 122 279.0.

Flierl, M. et al., "Generalized B Pictures and the Draft H.26L Video Compression Standard", IEEE Transactions on Circuits and Systems for Video Technology, [Online], (2002), pp. 1-11, [XP002481359 Stanford Retrieved from the Internet: URL: http://citeseer.ist.psu.edu/cache/papers/cs/26562/http:zSzzSzwww.stanford.eduzSz~bgirodzSzpdfszSzFlier1__CSVT2002Special.pdf/flier102generalized.pdf>].

Flierl, M. et al., "Generalized B Pictures. Workshop and Exhibition on MPEG-4", (Jun. 1, 2002), pp. 1-4, [XP002481338 Retrieved from the Internet: URL: http://citeseer.ist.psu.edu/cache/papers/cs/26433/htpp:zSzzSzwww.stanford.eduzSz~bgirodzSzpdfszSzFlier1MPEG4Workshop2002pdf/flier102generalized.pdf>].

European Search Report issued Mar. 27, 2009 in European Application No. 09 15 2597.

Notice of Allowance (with English translation) issued Oct. 12, 2009 in Taiwanese Application No. 95140993.

Office Action issued Oct. 14, 2010 in European Application No. 09 152 597.2.

H. Sun et al., "Error concealment algorithms for robust decoding of MPEG compressed video", Sep. 1997, p. 259 left column, § 2.

Extended European Search Report issued Jan. 13, 2011 in European Application No. 10 17 9945.

Office Action issued Apr. 15, 2011 in U.S. Appl. No. 11/976,271.

(56) References Cited

OTHER PUBLICATIONS

Office Action issued Jul. 3, 2012 in corresponding European Application No. 10179945.0.
Miska M. Hannuksela et al., "Random Access and Time Information: Appendix A. Proposed Changes to Joint Model", $2^{nd}$ Meeting, Jan. 29, 2002-Feb. 1, 2002, Geneva, CH, No. JVT-B109__Appendix A, Feb. 1, 2002, XP030005106, ISSN: 0000-0443.
Miska M. Hannuksela et al., "Random Access and Time Information", $2^{nd}$ Meeting, Jan. 29, 2002-Feb. 1, 2002, Geneva, CH, No. JVT-B109, Feb. 1, 2002, XP030005105, ISSN: 0000-0443.
Notice of Allowance issued Apr. 29, 2015 in corresponding Taiwanese Patent Application No. 102134575 (with English translation).

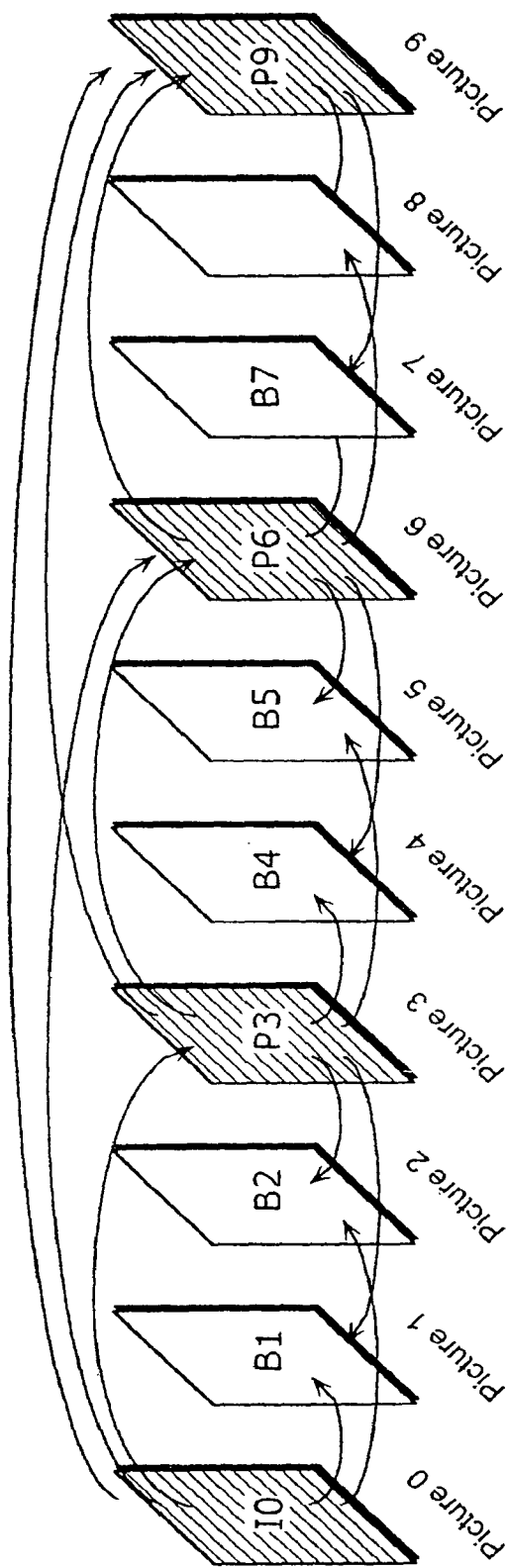
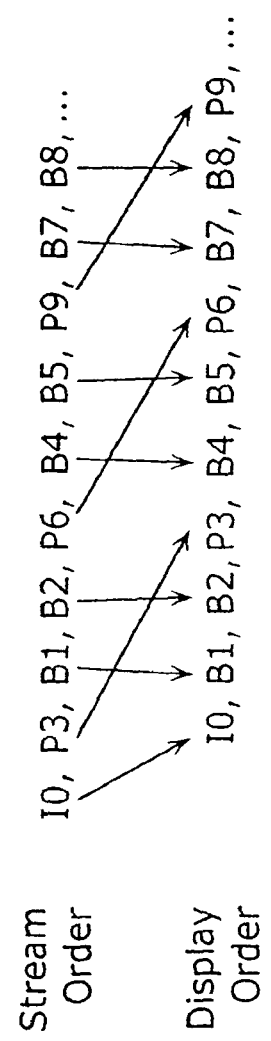
Fig. 24

Fig. 27

| Meanings | Codes |
|---|---|
| End of coding | '1' |
| Storage of picture | '01' |
| Release of picture | '001'+picture number to be released |
| Release whole memory | '000' |

PICTURE ENCODING METHOD AND PICTURE DECODING METHOD

CROSS REFERENCES TO RELATED APPLICATIONS

This application is a divisional of application Ser. No. 13/461,237, filed May 1, 2012, which is a continuation of application Ser. No. 11/976,272, filed Oct. 23, 2007, now U.S. Pat. No. 8,189,680, which is a continuation of application Ser. No. 11/605,958, filed Nov. 30, 2006, now U.S. Pat. No. 7,995,658, which is a divisional of application Ser. No. 10/481,012, now U.S. Pat. No. 7,206,347, which is the National Stage of International Application No. PCT/JP03/08576, filed Jul. 7, 2003. The entire disclosures of the above-identified applications, including the specification, drawings and claims are incorporated herein by reference in their entirety.

TECHNICAL FIELD

The present invention relates to a picture encoding method for compressing efficiently a moving picture and a picture decoding method for decoding correctly the encoded picture and displaying it.

BACKGROUND ART

Recently, with an arrival of the age of multimedia which handles integrally audio, video and pixel values of others, existing information media, i.e., newspapers, journals, TVs, radios and telephones and other means through which information is conveyed to people, has come under the scope of multimedia. Generally speaking, multimedia refers to something that is represented by associating not only with characters but also with graphics, audio and especially pictures and the like together. However, in order to include the aforementioned existing information media in the scope of multimedia, it appears as a prerequisite to represent such information in digital form.

However, when calculating the amount of information contained in each of the aforementioned information media as the amount of digital information, the information amount per character requires 1~2 bytes whereas the audio requires more than 64 Kbits (telephone quality) per second and when it comes to the moving picture, it requires more than 100 Mbits (present television reception quality) per second. Therefore, it is not realistic to handle the vast information directly in the digital format via the information media mentioned above. For example, a videophone has already been put into practical use via Integrated Services Digital Network (ISDN) with a transmission rate of 64 Kbit/s~1.5 Mbit/s. However, it is not practical to transmit video captured on the TV screen or shot by a TV camera. This therefore requires information compression techniques, and for instance, in the case of the videophone, video compression techniques compliant with H.261 and H.263 standards internationally standardized by ITU-T (International Telecommunication Union-Telecommunication Standardization Sector) to be employed. According to information compression techniques compliant with the MPEG-1 standard, picture information as well as music information can be stored in an ordinary music CD (Compact Disc).

Here, MPEG (Moving Picture Experts Group) is an international standard for compression of moving picture signals and MPEG-1 is a standard that compresses video signals down to 1.5 Mbit/s, that is, to compress information of TV signals approximately down to a hundredth of their original size. The transmission rate within the scope of the MPEG-1 standard is limited primarily to about 1.5 Mbit/s, therefore, MPEG-2 which was standardized with the view to meet the requirements of high-quality picture allows data transmission of moving picture signals at a rate of 2~15 Mbit/s. In the present circumstances, a working group (ISO/IEC JTC1/SC29/WG11) in charge of the standardization of the MPEG-1 and the MPEG-2 has achieved a compression rate which goes beyond what the MPEG-1 and the MPEG-2 have achieved, realized encoding/decoding operations on a per-object basis and standardized MPEG-4 in order to realize a new function required by the era of multimedia. In the process of the standardization of the MPEG-4, the standardization of an encoding method for a low bit rate was aimed. However, the aim is presently extended to a more versatile encoding of moving pictures at a high bit rate including interlaced pictures.

Recently, a new picture encoding as a next generation encoding of the MPEG-4 called JVC is under the process of standardization and being jointly worked on by the ITU-T and the ISO/IEC.

FIG. 24 is a diagram showing a prediction structure, a decoding order and a display order of pictures. "Picture" is a term indicating either a frame or a field and the term "picture" here is used instead of frame or field in the present specification. The hatched pictures in FIG. 24 represent the pictures to be stored in the memory for reference when other pictures are encoded/decoded.

I0 is an intra coded picture and P3, P6 and P9 are predictive coded pictures (P-picture). The predictive encoding in the scheme of the JVT standard differs from that of the conventional MPEG-1/2/4. An arbitrary picture is selected out of a plurality of encoded pictures as a reference picture and a predictive image can be generated from the reference picture. For example, a picture P9 may select an arbitrary picture out of three pictures of I0, P3 and P6 and generate a predictive image using the selected picture. Consequently, it heightens a possibility to select the more applicable predictive image than the conventional case of applying MPEG-1/2/4 and thereby improves a compression rate. B1, B2, B4, B5, B7 and B8 are bi-directionally predictive coded pictures (B-picture), differing from inter-picture prediction, wherein a plurality of pictures (two pictures) are selected and a predictive image is generated using the selected pictures and then encoded. It is especially known that the accuracy of the predictive image can be greatly improved and so can be the compression rate by performing interpolation prediction using an average value of two pictures temporally previous and subsequent for generating a predictive image. The marks of "I" for an intra coded picture, "P" for a predictive coded picture and "B" for a bi-directionally predictive coded picture are used in order to differentiate encoding method of each picture.

In order to refer to the temporally previous and subsequent pictures for the B-pictures, the temporally previous pictures shall be coded/decoded at first. This is called reordering of pictures and often takes place in the conventional MPEG-1/2/4. Therefore, in contrast with an encoding order (Stream Order), an order of displaying the pictures which are decoded (Display Order) is reordered as shown in FIG. 24 showing a prediction structure, a decoding order and a display order of pictures. B-pictures in the example of FIG. 24 are displayed at the moment when the stream is decoded, therefore, there is no need to store them when they are not referred to by other pictures. However, I-pictures and P-pictures have to be stored in a memory since they are displayed after being decoded when the decoding of the following B-picture is terminated.

The terms and the meanings of the hatched pictures in the diagram showing the prediction structure, the decoding order and the display order of the pictures are the same as those used in FIG. 24.

FIG. 26 is a block diagram showing a picture encoding apparatus for realizing a conventional picture encoding method. The following illustrates an operation of the picture encoding apparatus for realizing the conventional picture encoding method in FIG. 26.

A picture structure determination unit PicStruct determines an encoding type (I-picture, P-picture and B-picture) for each picture, notifies a reference picture control unit RefPicCtrl of the encoding type and the pictures that can be referred to in the encoding and informs also a reordering unit ReOrder of the encoding order of the pictures. The reordering unit ReOrder reorders the order of an input picture PicIn into an encoding order and outputs the reordered pictures to a motion estimation unit ME and a subtraction unit Sub. The motion estimation unit ME refers to the reference pictures stored in a picture memory PicMem1, determines an applicable reference picture and detects a motion vector indicating a pixel position of the reference picture and sends them to a variable length coding unit VLC, the picture memory PicMem1 and a motion compensation unit MC. The picture memory PicMem1 outputs the pixels of the reference picture according to the motion vector MV to the motion compensation unit MC whereas the motion compensation unit MC generates a predictive image using the pixels in the reference picture gained from the picture memory PicMem1 and the motion vector MV.

The subtraction unit Sub calculates a difference between the picture reordered by the reordering unit ReOrder and the predictive image. The difference is converted to frequency coefficients by an orthogonal transformation unit T and then the frequency coefficients are quantized by the quantization unit Q and outputted as quantized values Coef.

An inverse quantization unit IQ inverse quantizes the quantized values Coef and restores them as frequency coefficients. The inverse orthogonal transformation unit IT performs inverse frequency conversion for the frequency coefficients to be outputted as pixel differential values. An addition unit Add adds the predictive image to the pixel differential values and obtains a decoded picture.

The reference picture control unit RefPicCtrl, according to the encoding type of the picture, judges whether or not the decoded picture is to be stored in the picture memory PicMem1 to be referred to as a reference picture and whether or not the decoded picture is to be removed from the picture memory PicMem1 (no longer referred to as a reference picture) and notifies of the operation using a memory control command MMCO.

A switch SW is turned ON when the memory control command MMCO orders a storage and thereby the decoded picture is stored in the picture memory PicMem1 as a reference picture. The picture memory PicMem1 releases the area where the decoded picture is stored so that other decoded pictures can be stored when the picture memory PicMem1 instructs that the decoded picture shall be removed from the picture memory PicMem1.

The variable length coding unit VLC encodes the quantized values Coef, the motion vector MV and the memory control command MMCO and outputs an encoded stream Str.

The case in which the encoding includes the frequency conversion and the quantization is shown. However, the encoding may be one without them, such as DPCM, ADPCM, and linear predictive encoding. The encoding may be one in which the frequency conversion and the quantization are integrated or one that is not accompanied by the quantization after the frequency conversion, as in bit-plane encoding.

FIG. 27 shows bit streams of the memory control command MMCO. The variable length coding unit VLC encodes "000" which means a release of a whole memory area so that the picture memory is initialized at the beginning of the encoding/decoding or in the head of the GOP (Group Of Picture). Also, the variable length coding unit VLC encodes "01" when the decoded picture is stored in the picture memory. When a picture stored in the picture memory is released at the same time, the variable length coding unit VLC encodes a picture number following the "001" since the picture number to be released has to be indicated. When a plurality of pictures are released, the command to release a picture needs to be encoded for a plural number of times, therefore, a command to store a picture is encoded in addition to the command to release a picture. The variable length coding unit VLC encodes sequentially a plurality of memory control commands MMCO and encodes lastly "1" indicating that the memory control command MMCO is complete. In this way, the memory control command MMCO is encoded as an encoded stream Str.

FIG. 28 is a block diagram showing a picture decoding apparatus for realizing a conventional picture decoding method. The same numbers are used for the devices that operate in the same manner as the picture encoding apparatus for realizing the conventional picture encoding method shown in FIG. 26.

A variable length decoding unit VLD decodes an encoded stream Str and outputs a memory control command MMCO, a motion vector MV and quantized values Coef. A picture time Time is inputted from outside and is a signal for specifying a picture to be displayed. When a picture to be displayed is a decoded picture, an output from the adding unit Add is selected at a selector Sel and sent out to a display unit Disp. When a picture to be displayed is a picture stored in the picture memory PicMem1, it is read out from the picture memory PicMem1, selected at the selector Sel and outputted to a display unit Disp.

As described above, the picture memory PicMem1 outputs, to the motion compensation unit MC, pixels according to the motion vector MV whereas the motion compensation unit MC generates a predictive image according to the pixels obtained from the picture memory PicMem1 together with the motion vector MV.

The inverse quantization unit IQ inverse quantizes the quantized values Coef and restores them as frequency coefficients. Furthermore, the inverse orthogonal transformation IT performs inverse frequency conversion for the frequency coefficients to be outputted as pixel differential values. The addition unit Add adds the predictive image to the pixel differential values to generate a decoded picture.

The picture memory PicMem1 releases the area in which the decoded picture is stored so that another decoded picture can be stored.

The example of the decoding including the inverse frequency conversion and the inverse quantization is described above. However, the decoding may be one without them, such as DPCM, ADPCM and a linear predictive encoding. The decoding may be one in which the inverse frequency conversion and the inverse quantization are integrated or one that is not accompanied by the inverse quantization after the frequency conversion as in a bit-plane encoding.

With the use of the picture decoding apparatus for realizing the conventional picture decoding method shown in FIG. 28, it is obvious that the combination of the conventional picture encoding types shown in FIGS. 24 and 25 allows for a correct decoding of the encoded stream Str encoded by the picture encoding apparatus for realizing the conventional picture encoding method shown in FIG. 26.

The more flexible combination is considered here as a picture encoding type.

FIG. 1 is a diagram showing a prediction structure, a decoding order and a display order of the pictures, which do not exist in the related art. The prediction structure with respect to B-picture differs in the vicinity of Picture 4 in FIG. 1. Namely, Picture 2 that is a B-picture is stored in the picture memory to be referred to as a predictive image of Picture 1 and Picture 3. Consequently, the encoding order and the display order of each picture are as shown in FIG. 1.

Pictures B5 and B6 are B-pictures that are not stored since they are not referred to in a predictive coding. However, differing from FIG. 24, the display time for the pictures B5 and B6 has not yet come at the time when they are decoded since it is the time for other picture to be displayed. That is, at the time of decoding the picture B5, the picture P4 shall be displayed and at the time of decoding the picture B6, the picture B5 shall be displayed. Since the pictures B5 and B6 are not stored, they cannot be taken out from the picture memory at the display time. Therefore, the pictures which are not referred to for predictive encoding are not stored in the picture memory, therefore, the pictures B5 and B6 cannot be displayed after being decoded with the use of the conventional encoding/decoding method. Namely in the case of not storing the pictures that are not referred to in predictive encoding as in the example shown in FIG. 24, only Pictures 1, 2, 4, and 7 can be displayed.

Thus, considering the more flexible combination as a picture encoding type, it is a problem that the pictures which cannot be displayed after being decoded occurs. It is conceivable to add another picture memory for display and store the pictures that are not stored in the picture memory PicMem1 in this picture memory for display so that they can be displayed; however, the weak point is that this picture memory requires a huge memory in this case.

Furthermore, there rises a new problem in the reproduction of a picture in the middle of the stream even if another picture memory for display is introduced. FIG. 2 is a diagram showing a prediction structure, a decoding order and a display order of pictures. The difference comparing with FIG. 25 is that the prediction structure in the vicinity of Picture 7 becomes completely independent. The pictures following a picture I7 are not referred to when the pictures with display time preceding the picture I7 are encoded/decoded. Therefore, the pictures following the picture I7 can be encoded correctly if the decoding starts from the picture I7 and the picture I7 can be reproduced independently. In this way, the insertion of an I-picture while streaming often takes place. This system to reproduce a picture in the middle of the stream, which complies with MPEG-2, is called GOP (Group Of Picture).

The correspondence of a reproduced picture of the picture decoding apparatus and that of the picture encoding apparatus in the case of reproducing the picture in the middle of the stream has to be assured, and the easy method is to initialize the whole area of the picture memory. However, Picture 6 is not yet displayed and stored in the picture memory when Picture 7 is decoded, Picture 6 therefore cannot be displayed from the picture memory at its display time if the entire picture memory is initialized before the display of Picture 6 takes place.

The object of the present invention therefore is to allow the display of the pictures that cannot be displayed after being decoded by taking the memory amount necessary for encoding/decoding of the picture into consideration.

SUMMARY OF INVENTION

In order to achieve the above objects, a picture encoding method of the present invention of predictively encoding an input picture with reference to pictures stored in a picture buffer and decoding the encoded input picture has been developed. The picture encoding method comprises: judging whether or not the decoded picture is for reference and whether or not the decoded picture is for output, needing to be stored until a display time of the decoded picture; and storing the decoded picture in the picture buffer as one of the following uses: for reference and for output, based on each result of the judgments.

Here, the picture encoding method may comprise the following steps: a first judgment step of judging whether or not the decoded picture is for reference; a second judgment step of judging whether or not the decoded picture is for output, needing to be stored until display time of the decoded picture; and a management step of managing the picture buffer so that the picture buffer stores the decoded picture judged to be for reference in the first judgment step and the decoded picture judged to be for output in the second judgment step.

With this structure, the judgment on whether the decoded picture is a picture for output in addition to the judgment on whether the decoded picture is a picture for reference allows a storage not only of a picture for reference but also of a picture that is not referred to in the predictive encoding but cannot be displayed or outputted as a picture for output at the time of decoding. Such judgment and buffer management take place in the picture encoding to simulate a decoding operation, therefore, a picture for output can surely be displayed or outputted at its display time by the decoding apparatus.

Here, the picture buffer may have a specified size, and the picture encoding method may further comprise: a third judgment step of judging whether or not the picture for reference stored in the picture buffer is no longer used as a reference picture; and a fourth judgment step of judging whether or not the picture for output stored in the picture buffer is already outputted. In the management step, an area storing a picture in the picture buffer is reused within a scope of the specified size based on each result of the judgments in the third and fourth judgment steps.

With this structure, an area storing a picture is reused in the scope of the specified size of the picture buffer for storing the picture for reference and the picture for output in the management step, therefore, the picture buffer may be adapted for the specified size of essential requirements without wasting the memory.

Furthermore, the picture encoding method may include an encoding step of encoding, for each sequence, information indicating the specified size for encoding the said sequence including a plurality of encoded pictures.

With this structure, a picture structure to be used for predictive encoding can be defined flexibly for each sequence since the size is specified for each sequence.

Also, in the management step, one of the decoded pictures judged to be for reference in the first judgment step and the decoded picture judged to be for output in the second judgment step may be stored in an area storing a picture that is not for reference and is judged as already outputted in the fourth judgment step when the picture buffer doesn't have an area capable of newly storing a picture.

With the structure described above, a new picture is stored in an area storing the outputted picture out of areas allocated for a picture for output in the picture buffer. Namely, the area storing the outputted picture is reused so that the display of the decoded picture that is not yet outputted may be more assured.

Furthermore, in the management step, one of the decoded pictures judged to be for reference in the first judgment step and the picture judged to be for output in the second judgment step may be stored in an area storing a picture whose display order is the earliest of the pictures that are not for reference and stored within the picture buffer when the picture buffer doesn't have an area capable of newly storing a picture.

With the structure described above, there is a high possibility that a decoded picture already outputted is stored in an area storing a picture whose display order is the earliest of the pictures for output. Therefore, the display of the decoded picture that is not yet outputted may be more assured although the structure does not allow a correct determination on the display time of respective decoded pictures.

The picture encoding method may further comprise a releasing step of releasing an area other than an area storing a picture which is stored before a size of the input picture is modified and is not partly or wholly damaged after being stored out of areas storing display pictures, when the size modification takes place in a sequence including a plurality of encoded pictures.

With the structure described above, the pictures that are not yet outputted at the time of size modification can be outputted as many as possible without being removed since decoded pictures for output can be left in the decoded picture buffer when the size modification takes place.

Thus, according to the present invention, the pictures that cannot be displayed correctly in the related art can be displayed by making the most use of the released memory area without having unnecessary memory, and therefore, its practical value is high.

A picture decoding method, a picture encoding apparatus, a picture decoding apparatus and a program according to the present invention have the same structure, operation, and effects as described above.

The picture encoding method or the picture decoding method can be any of the compositions described in (1) through (16) below.

(1) A picture encoding method predictively encodes a picture signal with reference to a decoded picture stored in a memory after being decoded. The picture encoding method comprises the following steps: generating a predictive image with reference to the decoded picture in the memory and encoding a difference between the predictive image and the picture signal to obtain an encoded stream; decoding the encoded difference between the predictive image and the picture signal, adding the predictive image to the decoded difference to obtain a decoded picture and storing a predetermined decoded picture in the memory; and containing in the encoded stream instruction information indicating whether or not to release a whole area of the memory for making the area reusable.

(2) A picture encoding method predictively encodes a picture signal with reference to a decoded picture in a memory. The picture encoding method comprises: generating a predictive image with reference to the decoded picture in the memory; encoding a difference between the predictive image and the picture signal to obtain an encoded stream; decoding the encoded difference between the predictive image and the picture signal; adding the predictive image to the decoded difference to obtain a decoded picture; and storing the decoded picture in the memory when the decoded picture is one of i) a picture used for reference in order to generate a predictive image and ii) a picture that is not immediately displayable.

(3) A picture encoding method predictively encodes a picture signal with reference to a decoded picture. The picture encoding method comprises: generating a predictive image with reference to the decoded picture in a memory; encoding a difference between the predictive image and the picture signal to obtain an encoded stream; decoding the encoded difference between the predictive image and the picture signal, adding the predictive image to the decoded difference to obtain a decoded picture; storing a predetermined decoded picture in the memory and releasing an unnecessary picture in the memory, wherein the predetermined decoded picture is stored in an area storing a picture already displayed in the released area within the memory.

(4) A picture decoding method predictively decodes an encoded stream with reference to a decoded picture stored in a memory after being decoded. The picture decoding method comprises the following steps of: generating a predictive image with reference to the decoded picture in the memory, adding the predictive image to a picture signal obtained by decoding the encoded stream to obtain a decoded picture and storing a predetermined decoded picture in the memory; and a processing step of performing processing based on instruction information indicating whether or not to release a whole area of the memory obtained by decoding the encoded stream for making the area reusable.

(5) A picture decoding method predictively decodes an encoded stream with reference to a decoded picture. The picture decoding method comprises: generating a predictive image with reference to the decoded picture in a memory; decoding the encoded stream; adding the predictive image to the decoded encoded stream to obtain a decoded picture; storing a predetermined decoded picture in the memory and releasing an unnecessary picture in the memory, wherein the predetermined decoded picture is stored in an area in which a picture already displayed has been stored in the released area within the memory.

(6) A picture encoding method predictively encodes a picture signal with reference to a decoded picture. The picture encoding method comprises: generating a predictive image with reference to the decoded picture in a memory; encoding a difference between the predictive image and the picture signal to obtain an encoded stream; decoding the encoded difference between the predictive image and the picture signal, adding the predictive image to the decoded difference to obtain a decoded picture; storing a predetermined decoded picture in the memory and releasing an unnecessary picture in the memory, wherein the predetermined decoded picture is stored in an area in which a picture displayed at the earliest time has been stored in the released area within the memory.

(7) A picture decoding method predictively decodes an encoded stream with reference to a decoded picture. The picture decoding method comprises: generating a predictive image with reference to the decoded picture in a memory; decoding the encoded stream; adding the predictive image to the decoded picture to obtain a decoded picture; storing a predetermined decoded picture in the memory and releasing an unnecessary picture in the memory, wherein the predetermined decoded picture is stored in an area in which a picture displayed at the earliest time has been stored in the released area within the memory.

(8) A picture encoding method predictively encodes a picture signal with reference to a decoded picture. The picture encoding method comprises: generating a predictive image with reference to the decoded picture in a memory; encoding a difference between the predictive image and the picture signal to obtain an encoded stream; decoding the encoded difference between the predictive image and the picture signal, adding the predictive image to the decoded difference to obtain a decoded picture; storing a predetermined decoded picture in the memory and releasing an unnecessary picture in the memory, wherein the predetermined decoded picture is stored in an area that is capable of storing a picture and is firstly released in the memory.

(9) A picture decoding method predictively decodes an encoded stream with reference to a decoded picture. The picture decoding method comprises: generating a predictive image with reference to the decoded picture in the memory; decoding the encoded stream; adding the predictive image to the decoded encoded stream to obtain a decoded picture; storing a predetermined decoded picture in the memory and releasing an unnecessary picture in the memory, wherein the predetermined decoded picture is stored in an area that is capable of storing a picture and is released firstly in the memory.

(10) A picture encoding apparatus predictively encodes a picture signal with reference to a decoded picture. The picture encoding apparatus comprises: a prediction unit operable to generate a predictive image with reference to the decoded picture in a memory; an encoding unit operable to encode a difference between the predictive image predicted by the prediction unit and the picture signal to obtain an encoded stream; a decoding unit operable to decode the encoded difference; an addition unit operable to add the predictive image to the difference decoded by the decoding unit; a reference picture control unit operable to determine to store one of i) a picture used for reference in order to generate a predictive image and ii) a picture that is not immediately displayable; and a memory unit operable to store the adding result obtained from the addition unit based on the determination made by the reference picture control unit.

(11) A picture encoding apparatus predictively encodes a picture signal with reference to a decoded picture. The picture encoding apparatus comprises: a prediction unit operable to generate a predictive image with reference to the decoded picture in a memory; an encoding unit operable to encode a difference between the predictive image predicted by the prediction unit and the picture signal to obtain an encoded stream; a decoding unit operable to decode the encoded difference; an addition unit operable to add the predictive image to the difference decoded by the decoding unit; a reference picture control unit operable to determine whether or not to store an adding result obtained from the addition unit and whether or not to release an unnecessary picture in the memory; and a memory unit operable to store the adding result obtained from the addition unit in an area in which a picture already outputted as a decoded picture has been stored in the released area within the memory based on the determination made by the reference picture control unit.

(12) A picture decoding apparatus predictively decodes an encoded stream with reference to a decoded picture. The picture decoding apparatus comprises: a decoding unit operable to decode the encoded stream; a prediction unit operable to generate a predictive image with reference to the decoded picture in a memory; an addition unit operable to add the predictive image to the difference between the predictive image and the picture signal decoded by the decoding unit; a reference picture control unit operable to determine whether or not to store the adding result obtained from the addition unit in the memory and whether or not to release an unnecessary picture in the memory; and a memory unit operable to store an adding result obtained from the addition unit in an area in which a picture already outputted as a decoded picture has been stored in the released area in the memory based on the determination made by the reference picture control unit.

(13) A picture encoding apparatus predictively encodes a picture signal with reference to a decoded picture. The picture encoding apparatus comprises: a prediction unit operable to generate a predictive image with reference to the decoded picture in a memory; an encoding unit operable to encode a difference between the predictive image predicted by the prediction unit and the picture signal to obtain an encoded stream, a decoding unit operable to decode the encoded difference; an addition unit operable to add the predictive image to the difference decoded by the decoding unit; a reference picture control unit operable to determine whether or not to store the adding result obtained from the addition unit in the memory and whether or not to release an unnecessary picture in the memory; and a memory unit operable to store the adding result obtained from the addition unit in an area in which a picture displayed at the earliest time has been stored in the released area within the memory based on the determination made by the reference picture control unit.

(14) A picture decoding apparatus predictively decodes an encoded stream with reference to a decoded picture. The picture decoding apparatus comprises: a decoding unit operable to decode the encoded stream; a prediction unit operable to generate a predictive image with reference to the decoded picture in a memory; an addition unit operable to add the predictive image to the difference between the predictive image and the picture signal decoded by the decoding unit; a reference picture control unit operable to determine whether or not to store, in the memory, the adding result obtained from the addition unit and whether or not to release an unnecessary picture in the memory; and a memory unit operable to store the adding result obtained from the addition unit in an area in which a picture displayed at the earliest time has been stored in the released area within the memory based on the determination made by the reference picture control unit.

(15) A picture encoding apparatus predictively encodes a picture signal with reference to a decoded picture. The picture decoding apparatus comprises: a prediction unit operable to generate a predictive image with reference to the decoded picture in a memory; an encoding unit operable to encode a difference between the predictive image predicted by the prediction unit and the picture signal to obtain an encoded stream; a decoding unit operable to decode the encoded difference between the predictive image and the picture signal decoded by the decoding unit; an addition unit operable to add the predictive image to the difference decoded by the decoding unit; a reference picture control unit operable to determine whether or not to store the adding result obtained from the addition unit in the memory and whether or not to release an unnecessary picture in the memory; and a memory unit operable to store the adding result obtained from the addition unit in an area that is released at the earliest time of the whole released area within the memory based on the determination made by the reference picture control unit.

(16) A picture decoding apparatus predictively decodes an encoded stream with reference to a decoded picture. The picture decoding apparatus comprises: a decoding unit operable to decode an encoded stream; a prediction unit operable to generate a predictive image with reference to the decoded picture in a memory; an addition unit operable to add the predictive image to the difference between the predictive image and the picture signal decoded by the decoding unit; a reference picture control unit operable to determine whether or not to store, in the memory, the adding result obtained from the addition unit and whether or not to release an unnecessary picture in the memory; and a memory unit operable to store the adding result obtained from the addition unit in an area that is released at the earliest time of the whole released area within the memory based on the determination made by the reference picture control unit.

A storage medium for storing a program in which the picture encoding/decoding method of the present invention is executed by a computer may be any of (17) through (23) below.

(17) A storage medium employs a picture encoding method in which a computer is made to predictively encode a picture signal with reference to a decoded picture. The storage medium comprises: generating a predictive image with reference to a decoded picture in a memory; encoding a difference between the predictive image and the picture signal to obtain an encoded stream; decoding the encoded difference between the encoded predictive image and the picture signal, and adding the predictive image to the decoded difference and then outputting the adding result as a decoded picture, storing the decoded picture in the memory when the decoded picture is one of i) a picture used for reference in order to generate a predictive image and ii) a picture that is not immediately displayable.

(18) A storage medium employs a picture encoding method in which a computer is made to predictively encode a picture signal with reference to a decoded picture. The storage medium comprises: generating a predictive image with reference to the decoded picture in a memory; encoding a difference between the predictive image and the picture signal to obtain an encoded stream; decoding the encoded difference; adding the predictive image to the decoded difference to obtain a decoded picture; storing a predetermined decoded picture in the memory and releasing an unnecessary picture in the memory, wherein the predetermined decoded picture is stored in an area in which a picture already displayed has been stored in the released area within the memory.

(19) A storage medium employs a picture decoding method in which a computer is made to predictively decode an encoded stream with reference to a decoded picture. The storage medium comprises: generating a predictive image with reference to the decoded picture in a memory; decoding the encoded stream; adding the predictive image to the decoded encoded stream to obtain a decoded picture; storing a predetermined decoded picture in the memory and releasing an unnecessary picture in the memory, wherein the predetermined decoded picture is stored in an area in which a picture already displayed has been stored in the released area within the memory.

(20) A storage medium employs a picture encoding method in which a computer is made to predictively encode a picture signal with reference to a decoded picture. The storage medium comprises: generating a predictive image with reference to the decoded picture in a memory; encoding a difference between the predictive image and the picture signal to obtain an encoded stream; decoding the encoded difference; adding the predictive image to the decoded difference to obtain a decoded picture; storing a predetermined decoded picture in the memory and releasing an unnecessary picture in the memory, wherein the predetermined decoded picture is stored in an area in which a picture displayed at the earliest time has been stored in the released area within the memory.

(21) A storage medium employs a picture decoding method in which a computer is made to predictively decode an encoded stream with reference to a decoded picture. The storage medium comprises: generating a predictive image with reference to the decoded picture; decoding the encoded stream; adding the predictive image to the decoded encoded stream to obtain a decoded picture; storing a predetermined decoded picture in the memory and releasing an unnecessary picture in the memory, wherein the decoded picture is stored in an area in which a picture displayed at the earliest time has been stored in the released area within the memory.

(22) A storage medium employs a picture encoding method in which a computer is made to predictively encode a picture signal with reference to a decoded picture. The storage medium comprises: generating a predictive image with reference to the decoded picture in a memory; encoding a difference between the predictive image and the picture signal to obtain an encoded stream; decoding the encoded difference; adding the predictive image to the decoded difference to obtain a decoded picture; storing a predetermined decoded picture in the memory and releasing an unnecessary picture in the memory, wherein the predetermined decoded picture is stored in an area that is capable of storing a picture and is released firstly of the whole released area in the memory.

(23) A storage medium employs a picture encoding method in which a computer is made to predictively encode a picture signal with reference to a decoded picture. The storage medium comprises: generating a predictive image with reference to the decoded picture in a memory; encoding a difference between the predictive image and the picture signal to obtain an encoded stream; decoding the encoded difference; adding the predictive image to the decoded difference to obtain a decoded picture; storing a predetermined decoded picture in the memory and releasing an unnecessary picture in the memory, wherein the predetermined decoded picture is stored in an area in which a picture displayed at the earliest time has been stored in the released area within the memory.

A picture encoding method of defining memory constraint conditions for a stream and a picture decoding apparatus and encoding video for the picture encoding apparatus of the present invention may be any of (A1) through (A26) below.

(A1) A picture encoding method defines memory constraint conditions for a stream and a picture decoding apparatus. The picture encoding method comprises the following steps: determining a first maximum number of reference pictures that can be used; setting a second maximum number of reference pictures used for backward prediction; entering the second maximum number in a header of the stream; generating a virtual display delay buffer; generating a display counter; allocating a sufficient memory space for the reference pictures; and encoding the video. Here, the virtual display delay buffer is a virtual buffer for each picture for display to be stored in an area for display retained in a memory in the picture encoding apparatus and stores information indicating an order of outputting the pictures for display (picture order number or the like). The display counter records or updates a picture order number of the picture to be outputted virtually on the display. The sufficient memory space indicates an area for storing both the reference pictures and the pictures for display.

(A2) The picture encoding method according to (A1), wherein the first maximum number is determined according to a level value indicating a capacity of the decoder.

(A3) The picture encoding method according to (A1) or (A2), wherein the second maximum number is smaller than the first maximum number of reference pictures.

(A4) The picture encoding method according to (A1), (A2) or (A3), wherein the backward prediction of the entire stream is limited by the second maximum number.

(A5) The picture encoding method according to (A1), wherein a size of the virtual display delay buffer is the second maximum number minus 1.

(A6) The picture encoding method according to (A1) or (A5), wherein a physical memory for the virtual display delay buffer includes only display order information of the pictures.

(A7) The picture encoding method according to (A1), wherein the display counter is used for storing display order information of the pictures to be removed from the virtual display delay buffer.

(A8) The picture encoding method according to (A1), comprising the following steps of: predicting a predictive image for a current picture to be coded with reference to usable reference pictures; encoding the current picture; determining whether or not the encoded picture can be used for prediction; decoding the encoded picture; storing the decoded picture in the reference picture buffer; updating the virtual display delay buffer; and updating the display counter.

(A9) The picture encoding method according to (A1) or (A8), wherein one or a plurality of reference pictures can be used for the prediction of the picture when the picture is predictively encoded.

(A10) The picture encoding method according to (A1) or (A8), wherein the reference picture can be used only when the reference picture buffer meets the memory constraint conditions.

(A11) The picture encoding method according to (A1) or (A8), wherein the reference picture is decoded when the current picture is to be used as a reference picture.

(A12) The picture encoding method according to (A1), (A8) or (A10), further comprising the following steps of: determining memory constraint conditions of the number of reference pictures with respect to a following picture; removing an unused reference picture from the reference picture buffer; and adding the decoded picture to the reference picture buffer.

(A13) The picture encoding method according to (A1), (A8), (A10) or (A12), wherein a maximum number of the reference pictures with respect to the following picture equals to what the number of pictures in the virtual display delay buffer is subtracted from the first maximum number for the stream.

(A14) A picture encoding method according to (A1), (A8), (A10) or (A12), wherein the display order information for the display of the unused reference picture is moved to the virtual display delay buffer when the display order information for the display is greater than a value indicated at the display counter.

(A15) The picture encoding method according to (A1) or (A8), wherein the virtual display delay buffer stores the temporal information of the picture when a value indicated in the display order information is greater than a value indicated at the display counter.

(A16) The picture encoding method according to (A1), (A8) or (A15), wherein the virtual display delay buffer removes the display order information of the picture when the value indicated in the display order information is smaller than or equal to the value indicated at the display counter.

(A17) The picture encoding method according to (A1), (A8), (A10), (A12) or (A13), wherein the number of pictures in the virtual display delay buffer is defined according to a total number indicated in the display order information of the pictures that are present in the virtual display delay buffer.

(A18) The picture encoding method according to (A1) or (A8), wherein the display counter starts updating the display order information in one of cases: when the virtual display delay buffer is full and when the number of encoded pictures equals to the first maximum number.

(A19) The picture encoding method according to (A1), (A8) or (A18), wherein the display counter updates the display order information based on the display order information of each encoded picture.

(A20) The picture encoding method according to (A1), wherein a picture decoding method employed by a picture decoding apparatus comprises the following steps of: determining a maximum post decoder buffer size according to a stream header; determining a minimum number of necessary reference pictures; allocating a sufficient physical memory space for the reference pictures; decoding the stream; and outputting the stream.

(A21) The picture encoding method according to (A1) or (A20), wherein the maximum post decoder buffer size is the second maximum number set by the picture encoding apparatus.

(A22) The picture encoding method according to (A1) or (A20), wherein the minimum number of necessary reference pictures is fixed according to a capacity level of a picture decoding apparatus that can decode the same stream.

(A23) The picture encoding method according to (A1) or (A20), wherein the physical memory space allocated by the picture decoding apparatus can be used for storing both reference pictures and post decoder pictures.

(A24) The picture encoding method according to (A1) or (A20), wherein a total number of reference pictures and post decoder pictures does not surpass the allocated physical memory space.

(A25) The picture encoding method according to (A1) or (A20), wherein a firstly decoded picture is outputted in one of following cases: when the number of decoded pictures equals to the maximum size of post decoder buffer minus 1 and when a total number of decoded pictures equals to the determined minimum number of reference pictures.

(A26) The picture encoding method according to (A1) or (A20), wherein the decoded picture is removed from the post decoder buffer once the decoded picture is sent for output.

Also, a method of decoding a stream based on memory constraint conditions for a stream and a picture decoding apparatus employed by the picture decoding apparatus of the present invention may be any of (A27) through (A37) below.

(A27) A picture decoding method decodes a stream based on memory constraint conditions for a stream and a picture decoding apparatus. The picture decoding method comprises the following steps of: determining a first maximum number of reference pictures used for a stream; determining a second maximum number of reference pictures used for backward prediction; calculating a minimum size of a post decoder buffer; allocating a sufficient physical memory space for the post reference picture buffer; allocating a sufficient physical memory space for the post decoder buffer; decoding the stream; storing the decoded picture in a reference picture buffer; storing the decoded picture in the post decoder buffer; outputting the decoded picture. Here, the post decoder buffer is an area for display in a reference picture memory in the picture decoding apparatus.

(A28) The picture decoding method according to (A27), wherein the first maximum number is fixed for the picture decoding apparatus according to a capacity level to decode the stream.

(A29) The picture decoding method according to (A27), wherein the second maximum number is defined as the first maximum number minus 1.

(A30) The picture decoding method according to (A27), wherein the minimum size of the post decoder buffer is defined as the second maximum number minus 1.

(A31) The picture decoding method according to (A27) or (A30), wherein the minimum size of the post decoder buffer is obtained from the stream.

(A32) The picture decoding method according to (A27) or (31), wherein the second maximum number is defined as the minimum size of the post decoder buffer plus 1.

(A33) The picture decoding method according to (A27), wherein the minimum size of the reference picture buffer is defined as the first maximum number.

(A34) The picture decoding method according to (A27) or (A33), wherein the reference picture buffer is used only for storing reference pictures.

(A35) The picture decoding method according to (A27), (A30) or (A31), wherein the post decoder buffer is used for storing non-reference pictures.

(A36) The picture decoding method according to (A27), (A32) or (A33), wherein a reference picture is removed from the reference picture buffer when the reference picture is judged as a non-reference picture.

(A37) The picture decoding method according to (A27), (A30), (A31) or (A35), wherein picture in the post decoder buffer is removed from the post decoder buffer when outputted.

With the structure described above, a correct decoding of the stream can be assured by operating both the stream and the picture decoding apparatus under the same memory constraint conditions. Otherwise, a memory space sufficient for the picture decoding apparatus to decode the stream in the process of decoding cannot be assured.

BRIEF DESCRIPTION OF DRAWINGS

FIG. 24 is a diagram showing a prediction structure, a decoding order and a display order of the pictures.

FIG. 27 is a mapping diagram showing examples of codes for memory control commands MMCO.

DETAILED DESCRIPTION OF THE INVENTION

The following describes a first embodiment of the present invention.

First Embodiment

Figure 3:
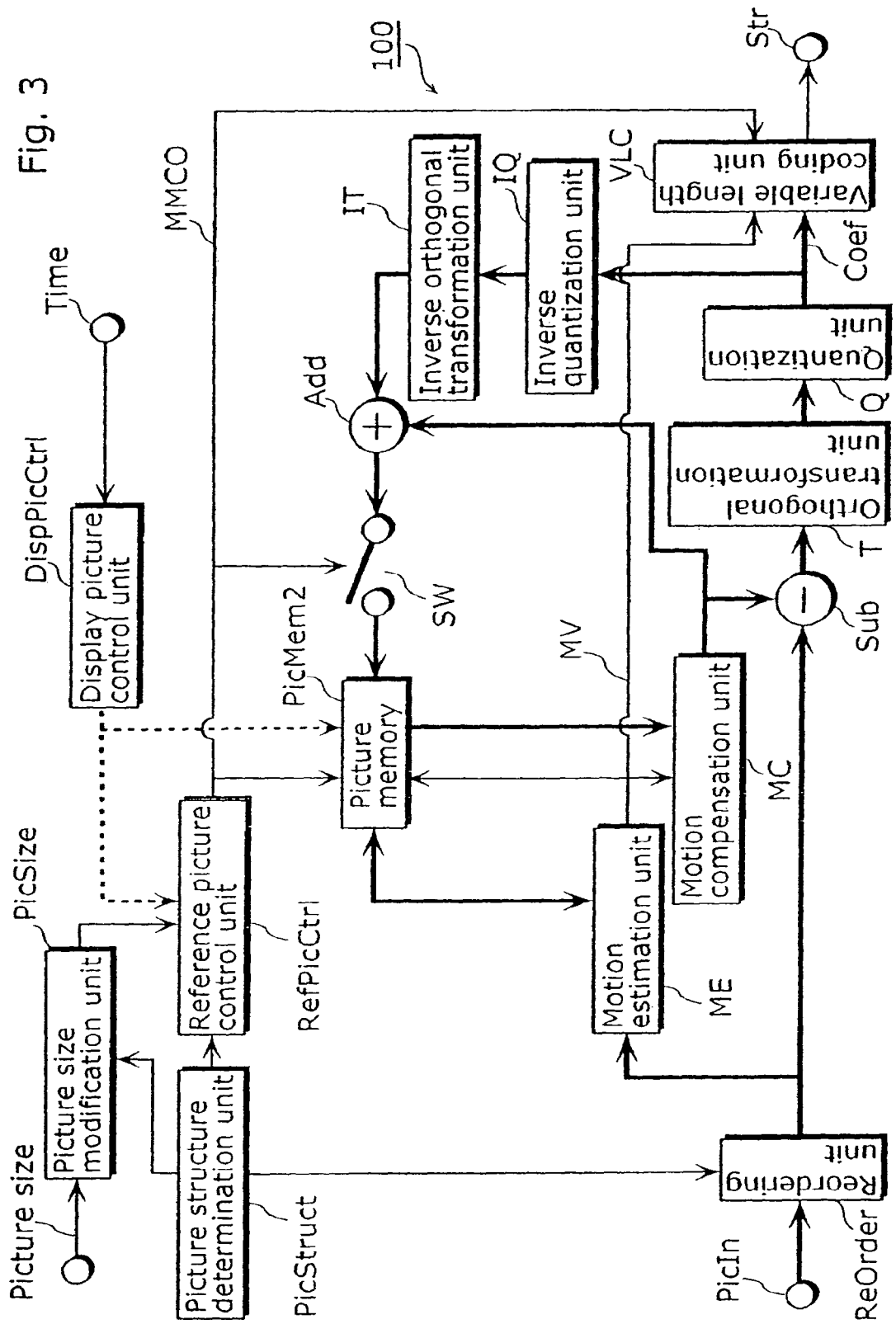
FIG. 3 is a block diagram showing a picture encoding apparatus for realizing a picture encoding method of the present invention described in a first embodiment.

FIG. 3 is a block diagram showing a picture encoding apparatus for realizing a picture encoding method of the present invention. The same reference numbers are used for the devices that operate in the same manner as described in the block showing a picture encoding apparatus for realizing a conventional encoding method shown in FIG. 26 and their explanation is thereby abbreviated.

Figure 26:
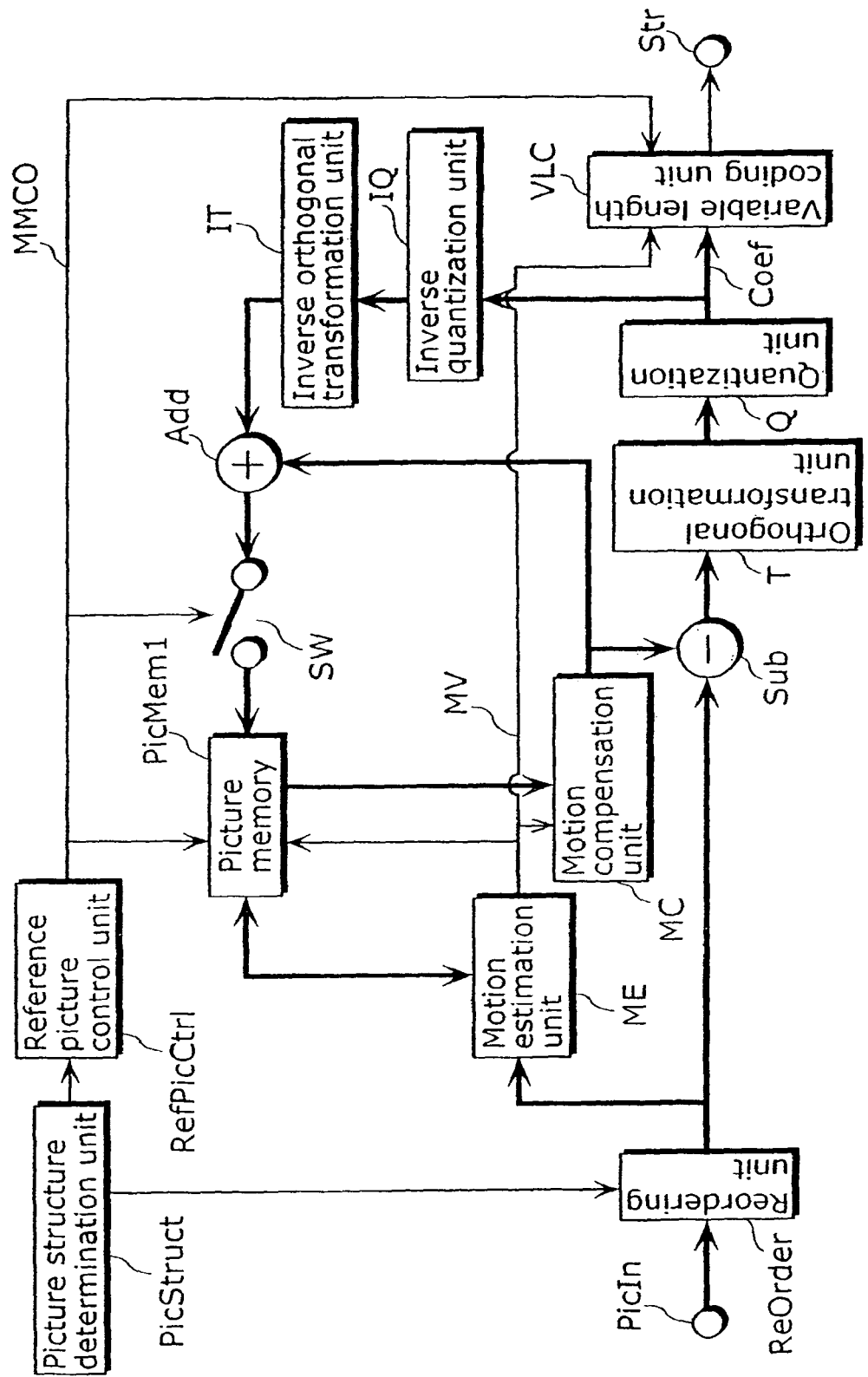
FIG. 26 is a block diagram of the picture decoding apparatus for realizing the conventional picture encoding method.

Differences between the block diagram in FIG. 26 showing the picture encoding apparatus for realizing the conventional picture encoding method and the block diagram in FIG. 3 showing the picture encoding apparatus for realizing the picture encoding method according to the present invention are that a display picture control unit DisPicCtrl is added to FIG. 3 and that instructions sent from the display picture control unit DisPicCtrl are outputted to a reference picture control unit RefPicCtrl and a picture memory PicMem2.

In the picture encoding apparatus 100 shown in FIG. 3, a picture size modification unit PicSize for obtaining a picture size modified by external operations as well as an encoding type of each picture (I-picture, P-picture and B-picture) from the picture structure determination unit PicStruct and outputting information indicating the picture size to be modified to a reference picture control unit RefPicCtrl is newly set.

The operation of the picture memory PicMem2 is almost the same as that of the picture memory PicMem1. Therefore, only different operations will be explained.

The display picture control unit DispPicCtrl obtains a picture time Time and judges whether a picture, which is not stored as it is not for reference, can be displayed immediately or not (whether it is necessary to store the picture in the picture memory until its display time). The picture time Time, a signal for specifying a picture to be displayed, is inputted from outside. The picture time can be obtained in the following ways: from the time information outputted from the system for transmitting pictures via a transmission line such as a packet, from the time information in a process of formatting a video stream and audio stream for multiplexing them; or from the time information in a process of formatting a video stream. The picture time may be either an absolute time which informs of the time for each picture or a relative time which informs of the order of the pictures. Moreover, the intervals of displaying pictures are normally fixed. Therefore, the order of displaying pictures may be considered as the display time.

Now, the case in which the picture is immediately displayable is a case in which the picture gained after the calculation in the adder Add corresponds with the picture to be displayed indicated by the picture time Time. In this case, a picture to be displayed before the picture that is not yet displayed and outputted for encoding is not found in the picture memory PicMem2. When the picture is not immediately displayable, the display picture control unit DispPicCtrl instructs the reference picture control unit RefPicCtrl to store the picture, even though it is not for reference, in the picture memory PicMem2. Consequently, the picture which is not displayed immediately is stored in the picture memory PicMem2 without fail regardless of whether it is for reference or not and can be displayed out of the picture memory PicMem2 in the decoding apparatus.

Figure 4:
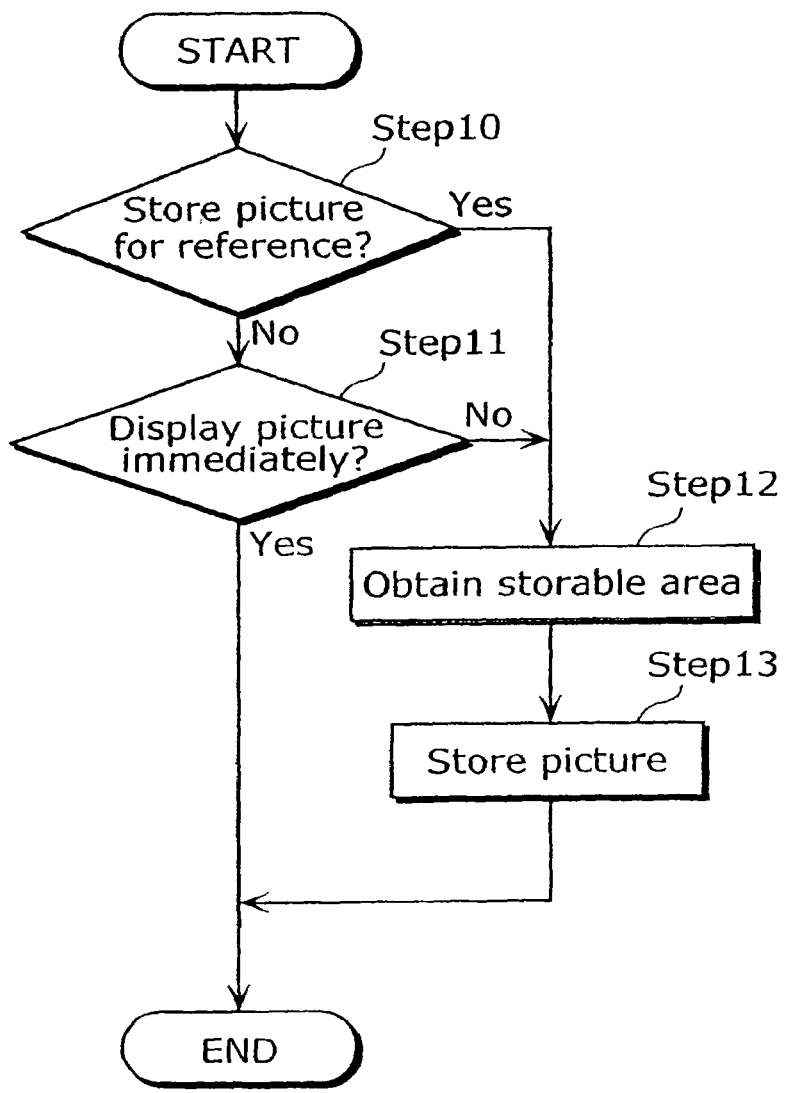
FIG. 4 is a flowchart showing an operation of a reference picture control unit of the present invention described in the first embodiment.

FIG. 4 is a flowchart showing an operation of the reference picture control unit RefPicCtrl of the present invention.

The reference picture control unit RefPicCtrl judges whether or not a decoded picture (picture) is to be stored for reference for a predictive image (Step 10). When the decoded picture is to be used for reference, the operation proceeds to Step 12, and otherwise to Step 11.

Figure 1:
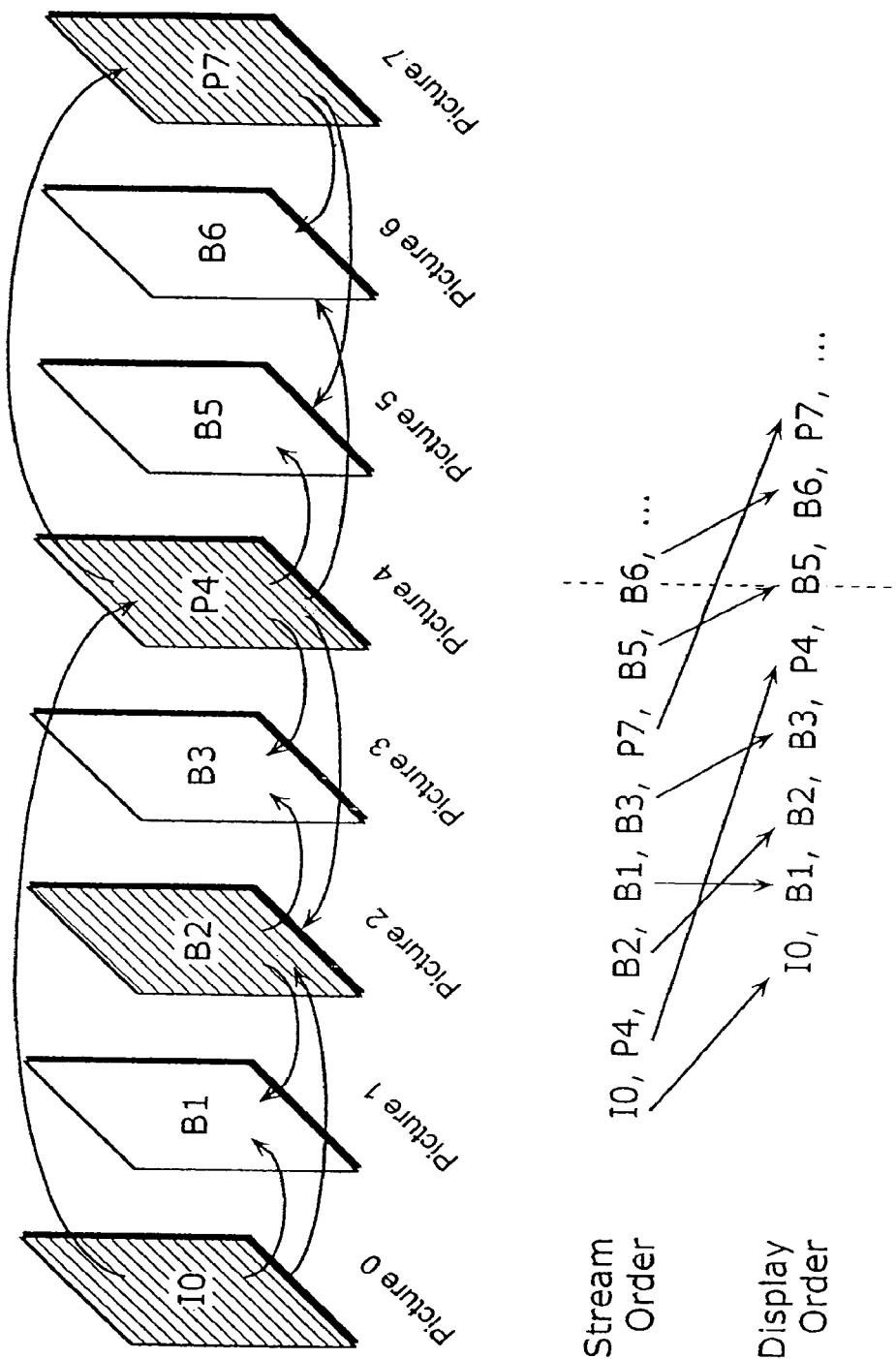
FIG. 1 is a diagram showing a prediction structure, a decoding order and a display order of pictures.
Figure 2:
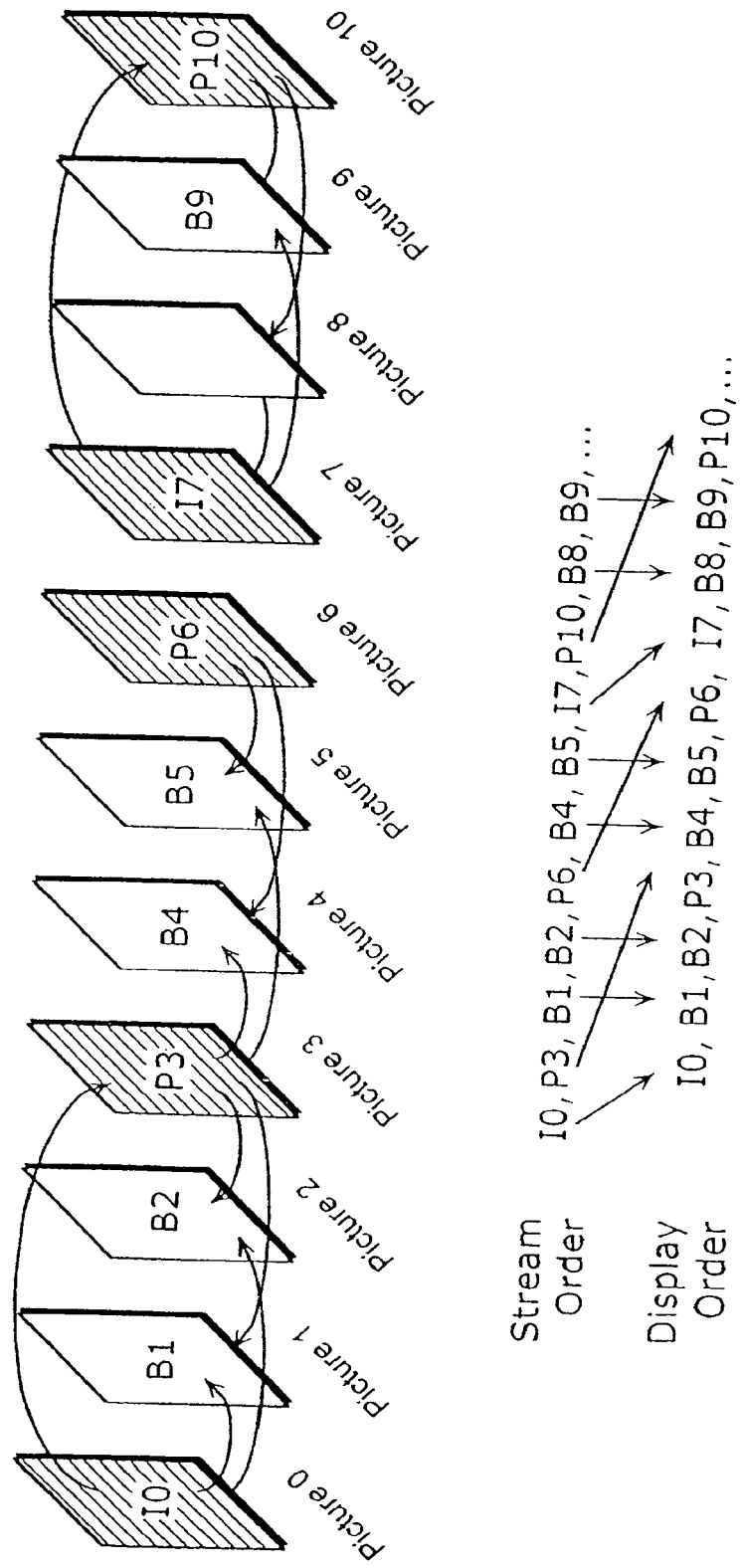
FIG. 2 is a diagram showing a prediction structure, a decoding order and a display order of the pictures.

In Step 11, the reference picture control unit RefPicCtrl judges whether or not the decoded picture is immediately displayable. "Immediately displayable" here means that the decoded picture can be displayed at the time of being decoded (see, for example, Picture 1 in FIG. 1). The decoded picture which is not immediately displayable means that it needs to be displayed later (for instance, B5 shown in FIG. 1). When the picture is immediately displayable, the operation is terminated. Otherwise, it goes on to Step 12.

In Step 12, the reference picture control unit RefPicCtrl obtains an area capable of storing a picture in the picture memory PicMem2 and instructs it to store the decoded picture in the area obtained in the picture memory PicMem2 using a memory control command MMCO in Step 13.

In this way, the picture which is not displayed immediately is stored in the picture memory PicMem2 and can be outputted for display from the picture memory PicMem2 when the time has come for its display. This does not require an unnecessary picture memory assigned for a picture for display and a picture that needs to be stored for display can be stored in the picture memory assigned for a picture for reference.

The picture memory PicMem2 includes an area for reference in which a reference picture is stored for generating a predictive image and an area for display in which a picture for display is stored.

Meanwhile, a picture size can be modified for each GOP (Group Of Picture) mentioned before. The modification of the picture size takes place only when a whole area for reference in the memory storing an unnecessary reference picture is released (make the status of the memory reusable).

However, when the modification of the picture size takes place as described above, the picture for display that is not yet displayed is stored in the memory area, and it is necessary to determine explicitly a coping strategy of how to handle this picture for display but not yet displayed (whether to delete it or to store it until it is displayed).

Here, a storing state of pictures in the memory when the change of the picture size takes place is explained in stages.

Figure 5:
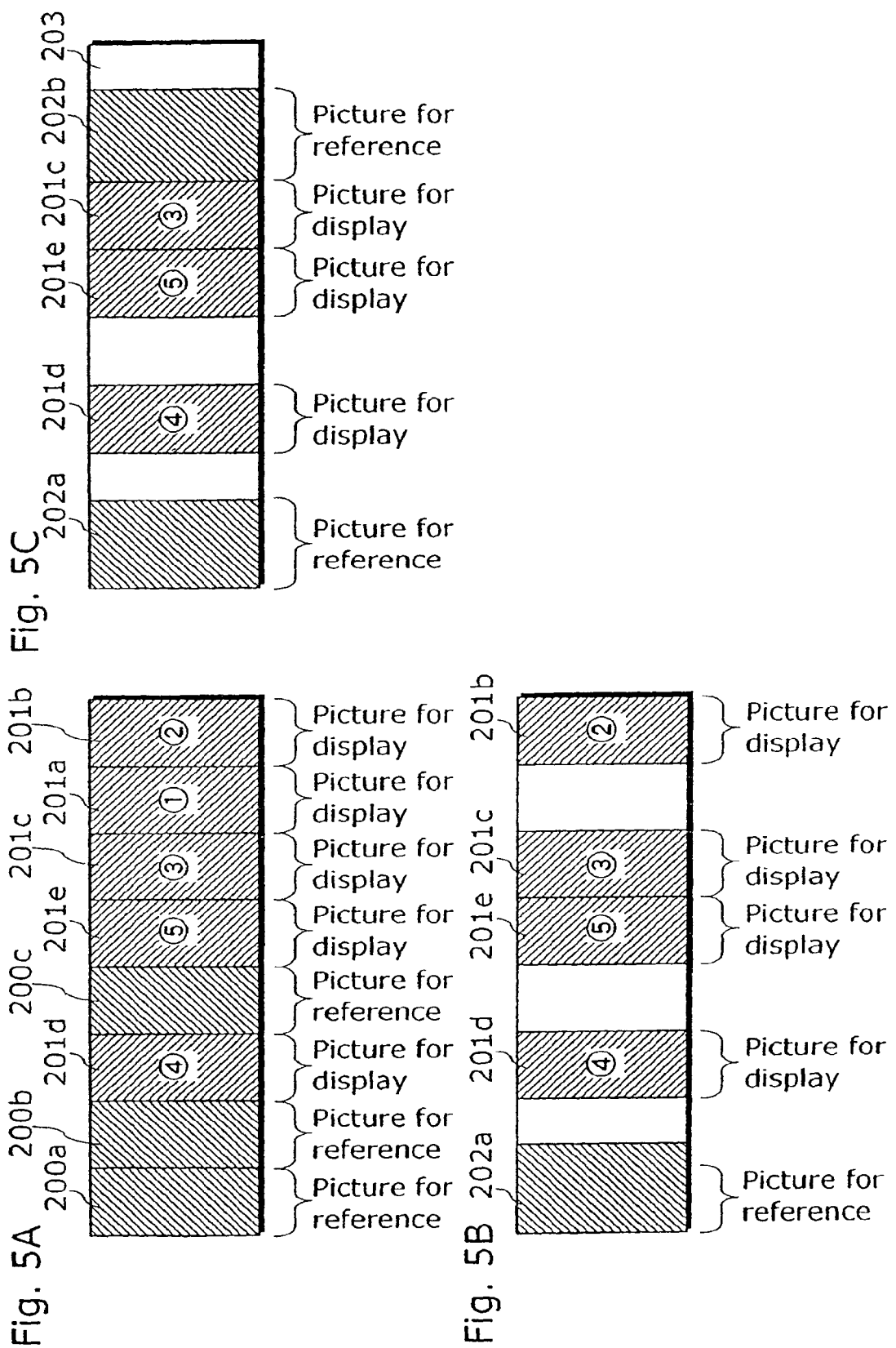
FIGS. 5A, 5B and 5C are state diagrams showing a storage status of the pictures in the memory.

FIGS. 5A, 5B and 5C are state diagrams showing the storing status of the pictures in the memory in stages.

In 5A, pictures 200a, 200b and 200c are the pictures for reference (the pictures to be used for reference in order to generate a predictive image) whereas pictures 201a, 201b, 201c, 201d, and 201e are the pictures for display (pictures to be displayed and not displayed yet).

The pictures 201a, 201b, 201c, 201d and 201e will be displayed in the numeric order as shown in FIG. 5A.

FIG. 5A illustrates the status in which the whole memory areas assigned for the reference pictures 200a, 200b and 200c are released for the reusability.

FIG. 5B shows that the picture size is modified following the status shown in FIG. 5A. A reference picture 202a being modified to a bigger size is stored in the memory area in which the reference picture 200a has been stored. Furthermore, the picture for display 201a is outputted for display and its memory area is released.

FIG. 5C shows a status in which the memory area storing the picture for display 201b is released after the status shown in FIG. 5B. A reference picture 202b being modified into a bigger size is stored in the memory area in which the pictures for display 201a and 201b have been stored and a small memory area 203 is left. Even though the memory area storing the picture for display 201c is released, the reference picture (whose picture size is enlarged) cannot be newly stored.

Thus, when the picture size is modified, the pictures of different picture sizes are mixed in the memory (the reference pictures whose picture sizes are enlarged and the pictures for display which are not yet displayed and whose sizes are not yet modified).

Consequently, the memory is used fragmentarily, which produces a small memory area that cannot be used, and the usability is thereby deteriorated. When the data in the memory is repositioned so that the small memory area caused by the modification of the picture size disappears, the memory access increases greatly and thereby it is difficult to realize encoding and decoding operations in actual time.

When the picture size is modified, two methods are conceivable. The first method is to release the area for display in which the pictures for display that are not yet displayed are stored and the area for reference in which the reference pictures are stored (as a reusable state) and give up the display of the pictures for display that are not yet displayed. This can prevent the fragmentary use of the memory caused by the mixture of the pictures of different sizes and thereby the deterioration in the usability of the memory can be reduced.

The modification in the picture size described above takes place as described in the following. The picture size modification unit PicSize shown in FIG. 3 receives the encoding type (I-picture, P-picture and B-picture) of each picture determined by the picture structure determination unit PicStruct and the picture size for the modification inputted from outside and outputs to the reference picture control unit RefPicCtrl an instruction to modify the picture size with the timing to start encoding an I-picture. The I-picture is a special I-picture (IDR (Instantaneous Decoding Refresh) picture) to be inserted, for example, in the beginning of the GOP.

The second method is to switch between a method to release the whole area of the memory and discard the pictures for display that are not yet displayed and a method to release only the area for reference in which the reference pictures are stored and display the pictures for display that are not yet displayed before the size modification takes place with a judgment made by a picture decoding apparatus (decoder) for decoding an encoded signal (stream) that is referred to later on so that the display of the pictures for display that are not yet displayed is not obligatory. In this case, the picture decoding apparatus displays the displayable pictures, for instance, the undamaged pictures according to the display order.

For operating such switching, instruction information (flag) indicating one of the following methods: the method to release the whole area of the memory; and the method to release only the area for reference in which the reference picture is stored, or other identifiable information is contained in the stream Str outputted from the picture encoding apparatus 100.

On the side of the picture decoding apparatus, the processing is operated based on the instruction information placed in the stream.

The following examples are conceivable for the judging criteria in order to switch between the two methods indicated by the instruction information: a content creator may decide the method according to an application; and only the area for reference is released but not the area for display storing a picture for display that is not yet displayed (not releasing the whole area of the memory) when memory can afford to provide the space.

With the above construction, the picture encoding apparatus can be realized to solve the existing problems.

Second Embodiment

The following describes a second embodiment of the present invention.

In the present embodiment, the display picture control unit DispPicCtrl shown in FIG. 3 instructs the picture memory PicMem2 not to store a new picture in the area storing the picture that is not yet displayed, when a picture is stored in the released memory area. Normally, even when an area for picture is released, a picture previously stored can be reproduced as long as a picture is not newly stored (overwritten) in the area. Even if a memory area in which the picture that is not yet displayed is released, the picture that is not yet displayed and is released at the time of display, but is left without being overwritten, can be displayed by storing a new picture not in the memory area, but in the area where the picture that is already displayed is stored. The picture in the released picture area of the picture memory is called picture for display. "Already displayed" here is practically synonymous with "already outputted to a display device".

Figure 6:
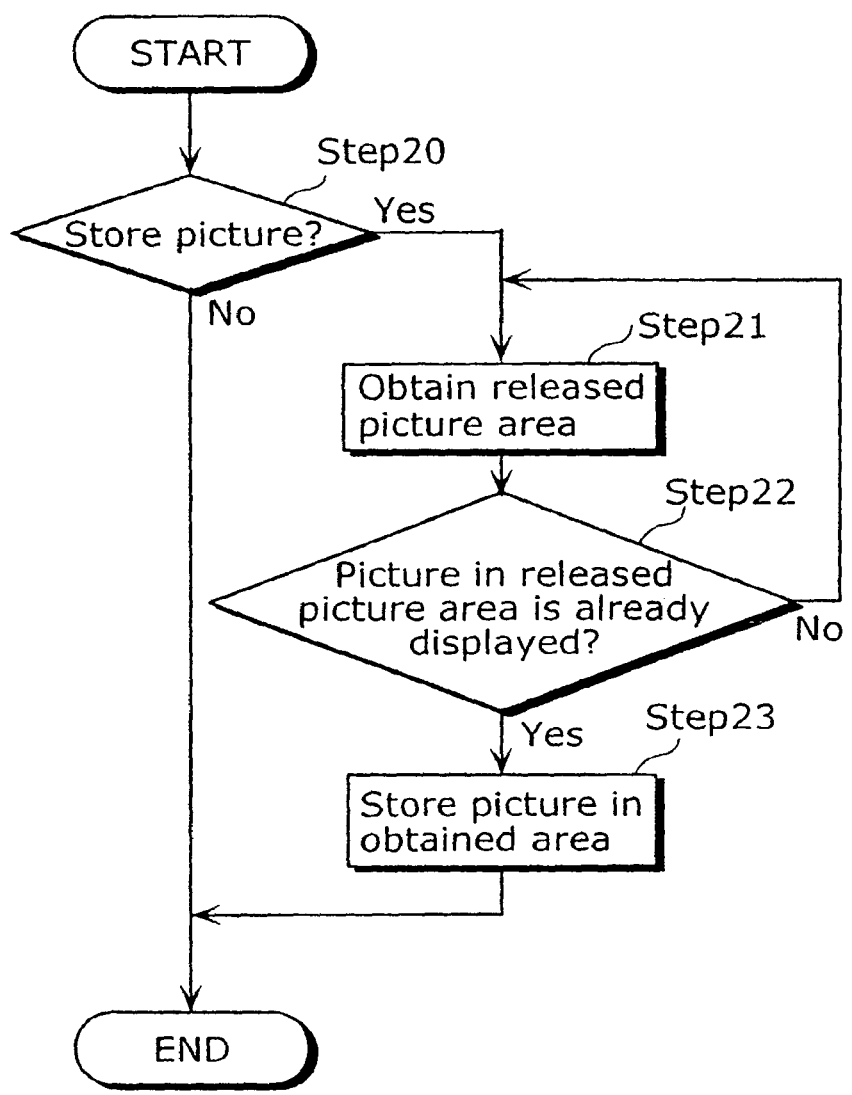
FIG. 6 is a flowchart showing an operation of the picture encoding apparatus of the present invention described in a second embodiment.

FIG. 6 is a flowchart showing an operation of the picture encoding apparatus 100 of the present embodiment. The present embodiment characterizes in determining the storage of the picture by judging whether the picture stored in the released area in the memory is already displayed or not.

Firstly, in Step 20, the picture encoding apparatus 100 judges whether or not the decoded picture is to be stored in the picture memory PicMem2 based on the instructions indicated in the memory control command MMCO.

In the case of storing the decoded picture in the picture memory, the released picture area is obtained (Step 21) and whether a picture stored in the released picture area is already displayed or not is verified (Step 22). When it is not yet displayed, the operation goes back to Step 21 and the processing continues until the released area in which the picture already displayed has been stored is found.

When such released area is found, the decoded picture is stored in the area (Step 23).

Thus, when the picture to be displayed is displayed, the picture that is not yet displayed is stored in the memory without being overwritten until its display time since the area storing the displayed picture is reused.

Whether a picture stored in the memory is already displayed or not can be judged by the display picture control unit DispPicCtrl managing information on whether or not the picture is displayed.

Whether a picture area is a released area or not can be judged by referring to the information on whether or not each picture area is released, for instance, "used (usable as a reference picture)" or "unused (no longer used as a reference picture)" stored in the picture memory PicMem2 according to the memory control command MMCO.

With the above structure, the picture encoding apparatus of the present invention can be realized so as to overcome the existing problems.

Thus, overwriting of a new picture to the picture that is not yet displayed can be prevented so that the latter picture can be outputted for display from the area that is already released but not overwritten at the display time. The picture that needs to be stored for display can be stored without requiring an unnecessary memory.

As the operation in the case which requires the modification in the picture size is the same as in the first embodiment, the explanation is abbreviated.

Third Embodiment

The following describes a third embodiment of the present invention.

Figure 7:
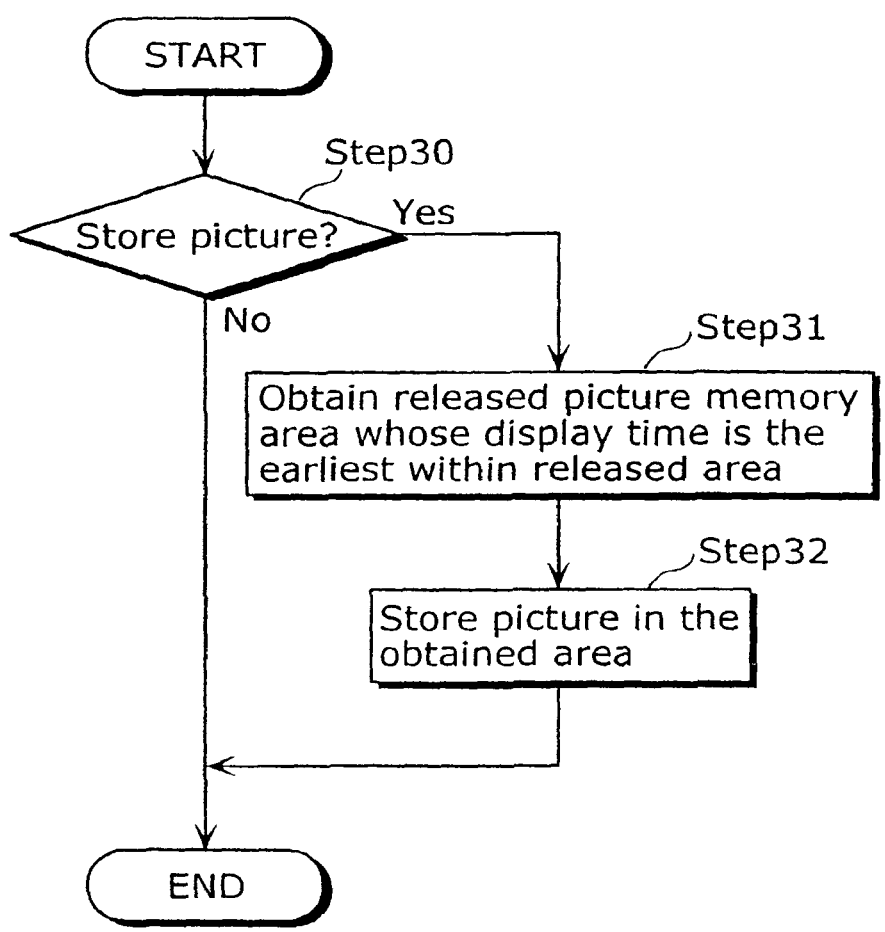
FIG. 7 is a flowchart showing an operation of the picture encoding apparatus of the present invention described in a third embodiment.

FIG. 7 is a flowchart of an operation of the picture encoding apparatus 100 of the third embodiment of the present invention. The present embodiment characterizes in determining the storage of the picture according to the time when the memory is released.

Firstly, in Step 30, the picture encoding apparatus 100 judges whether or not the decoded picture is to be stored in the picture memory PicMem2 based on the instruction indicated in the memory control command MMCO.

In the case of storing the decoded picture in the picture memory, the released picture memory area whose display time is the earliest within released area is obtained (Step 31) and the decoded picture is stored in the obtained area (Step 32).

The memory area in which the picture is decoded and stored at the earliest time instead of the memory area released at the earliest display time may be allocated as an area to store the picture. For, there is a high possibility that the pictures stored in these memory areas are already displayed.

These earliest times are not necessarily based on time and may be the earliest time according to an order, for instance, it may be the earliest time according to a display order. For example, it is highly possible that a picture whose display order is the earliest is already displayed and a memory area storing such picture can be reused in turn as a storing area in the memory regardless of whether it is already displayed or not. Normally, the intervals of displaying pictures is regular, and therefore, the order of displaying pictures may be considered as the display time.

Thus, overwriting of a new picture onto the picture that is not yet displayed can be prevented so that the latter picture can be outputted for display from the area that is already released but not overwritten at the display time. The picture that needs to be stored for display can be stored without requiring an unnecessary memory. The processing of storing the picture which needs to be stored for display can be carried out regardless of whether the picture stored in the picture memory PicMem2 is already displayed or not. When the earliest time indicates the earliest time in display time, whether or not the picture is stored at the earliest time can be judged by the display picture control unit DispPicCtrl managing the information on whether or not the picture is displayed.

As an operation in a case in which a modification of a picture size is required is the same as the one described in the first embodiment, the explanation is abbreviated.

Fourth Embodiment

The following illustrates a fourth embodiment of the present invention.

Figure 8:
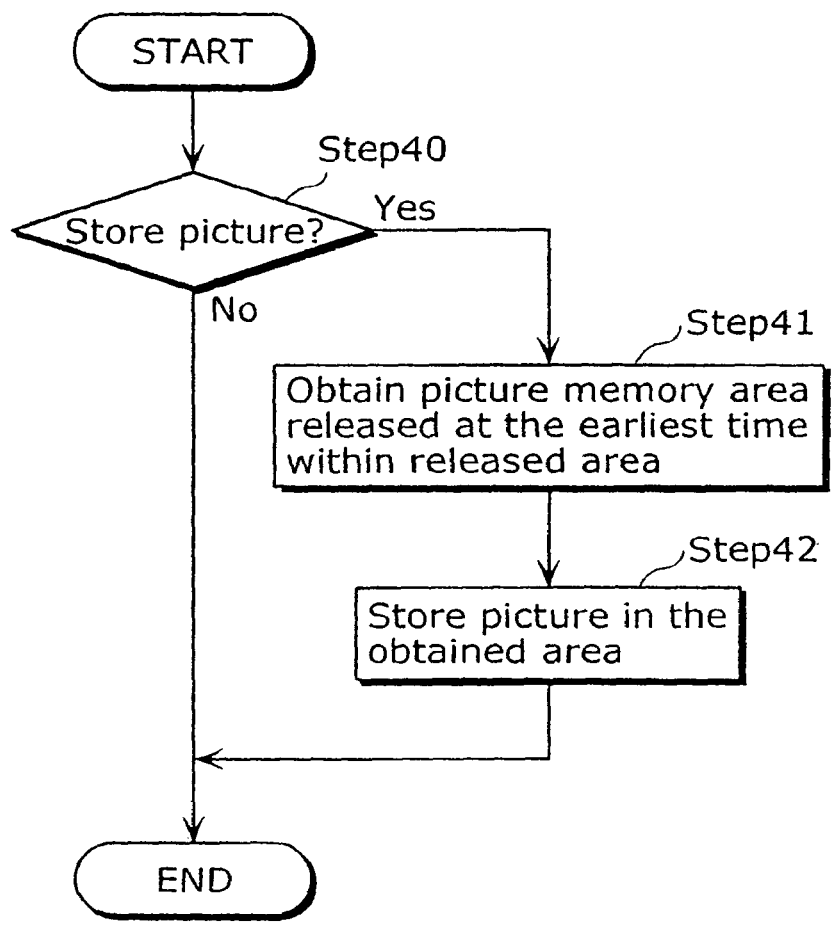
FIG. 8 is a flowchart showing an operation of the picture encoding apparatus of the present invention described in a fourth embodiment.

FIG. 8 is a flowchart showing an operation of the picture encoding apparatus 100 according to the fourth embodiment of the present invention. The present embodiment characterizes in determining a storage of the picture according to an order of releasing the memory.

Firstly, in Step 40, the picture encoding apparatus 100 judges whether or not the decoded picture is to be stored in the picture memory PicMem2 based on the instruction indicated in the memory control command MMCO.

In the case of storing the decoded picture in the picture memory, the picture memory area released at the earliest time within the released area is obtained (Step 41) and the decoded picture is stored in the obtained area (Step 42).

Since it is a system that manages the information on display time, it is difficult to obtain the display time depending on a method to fabricate a video decoding apparatus. It is highly possible that the picture with the earliest display time is stored in the area firstly released rather than in the area released at the later time. Namely, it is with high possibility that the picture firstly released is already displayed. Therefore, there is a high possibility that the picture that is not yet displayed is not overwritten when the decoded picture is stored in the picture area firstly released.

Whether the picture area is a released area or not can be judged by referring to the information on whether or not each picture area is released, for instance, "used (usable as a reference picture)" or "unused (no longer used as a reference picture)" that is stored in the picture memory PicMem2 according to the memory control command MMCO. Or, the usage of the picture area can be fixed beforehand to a predetermined procedure in order to judge whether the picture area is the one that is firstly released according to the procedure. For example, this can be judged by the picture memory PicMem2 functioning as a memory using a first-in first-out (FIFO) method by which the contents of record whose time records that picture is to be stored newly are sequentially discarded in turn and the latest pictures of a fixed number of frames (or number of pictures) are always stored. Thus, overwriting a new picture to a picture that is not yet displayed can be prevented so that the latter picture can be outputted for display from the area that is already released but not overwritten at the display time.

As an operation in the case in which the modification of the picture size is required is the same as the one described in the first embodiment, the explanation is abbreviated.

Fifth Embodiment

The following illustrates a fifth embodiment of the present invention.

Figure 9:
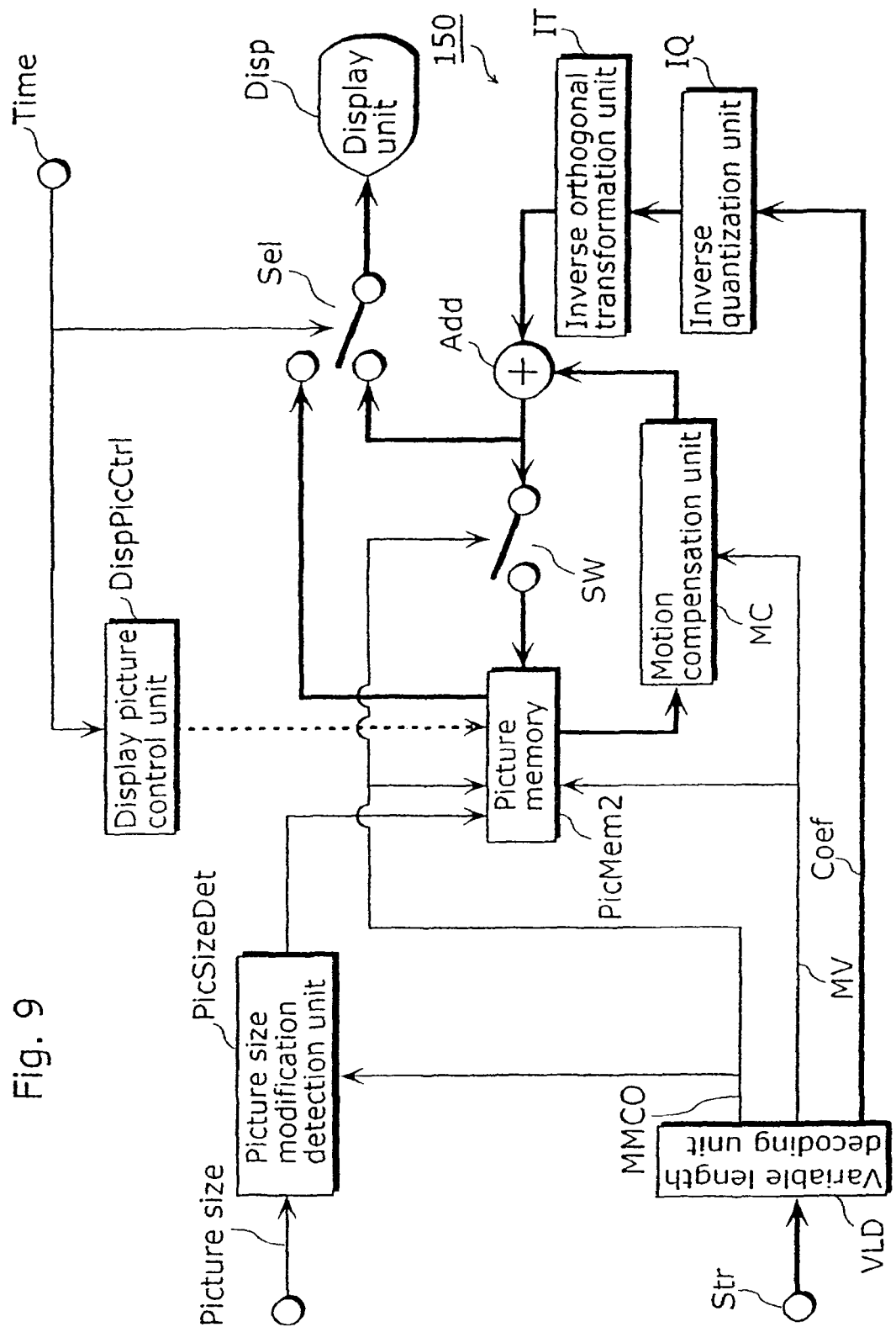
FIG. 9 is a block diagram showing a picture decoding apparatus for realizing a picture decoding method of the present invention described in a fifth embodiment.

FIG. 9 is a block diagram of a picture decoding apparatus for realizing the picture decoding method of the present invention. The same reference numbers are used for the devices that operate in the same manner as a picture encoding apparatus for realizing the picture encoding method according to the present invention shown in the block diagram of FIG. 3 and a picture decoding apparatus for realizing the conventional picture decoding method shown in the block diagram of FIG. 28 and their explanation is thereby abbreviated.

Figure 28:
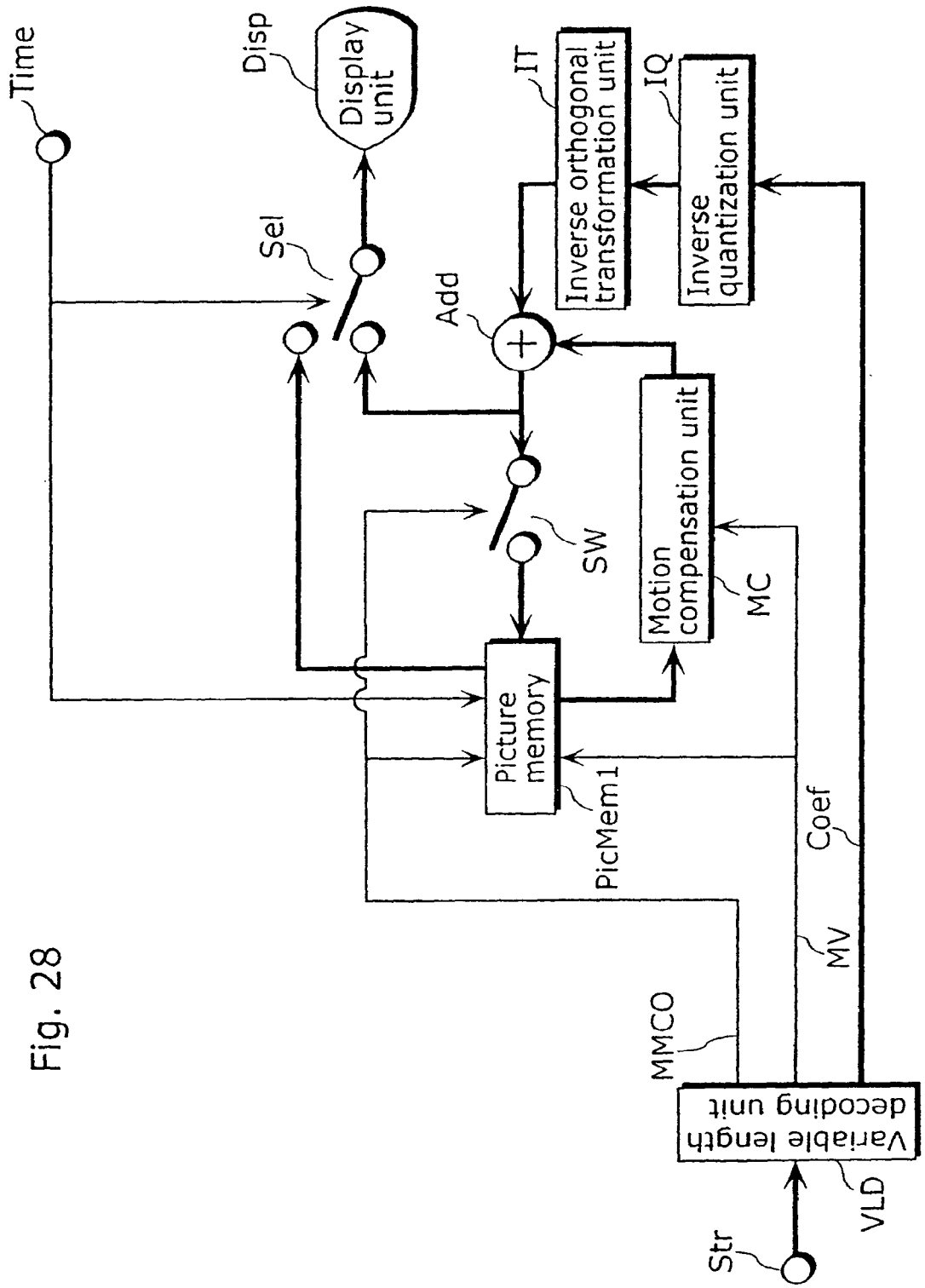
FIG. 28 is a block diagram of the picture decoding apparatus for realizing the conventional picture decoding method.

The difference between the picture decoding apparatus 150 shown in FIG. 9 and the example of conventional apparatus shown in FIG. 28 is that a picture size modification detection unit PicSizeDet and a display picture control unit DispPicCtrl are newly set. The picture size modification detection unit PicSizeDet outputs a command to modify the picture size in the timing of starting encoding of a special I-picture (IDR picture) based on the picture size for the modification obtained from outside and the memory control command MMCO obtained from the variable length decoding unit VLD.

The display picture control unit DispPicCtrl instructs the picture memory PicMem2 not to store a new picture in the area for the picture that is not yet displayed when storing the new picture in the released area. Normally, even though an area for a picture is released, data of a picture that is stored right before is left in the memory and can be reproduced as long as a picture is not newly stored (overwritten) in the area. The picture that is released at the time of display but left without being overwritten can be displayed by storing a new picture in the area where the picture that is already displayed is stored even if the memory area in which the picture that is not yet displayed is released. "Already displayed" here is practically synonymous with "already outputted to a display device".

Thus, when the picture to be displayed is displayed, the picture that is not yet displayed is stored in the memory without being overwritten until its display time since the area storing the displayed picture is reused.

With the above structure, the picture decoding apparatus of the present invention can be realized in order to overcome the existing problems. The picture decoding apparatus 150 may decode an encoded signal that is encoded by the picture encoding apparatus 100 shown in the third and fourth embodiments. In this case, the operation for the use of the picture memory is as same as the one described for the picture encoding apparatus shown in the third and fourth embodiments. Namely, for the reusability of the picture area that is released (no longer used for reference) in the picture memory, either method of deciding the area for the picture to be newly stored described in the first through third embodiments may be employed.

The following describes methods of storing the picture in the memory when decoding the encoded signal encoded by the picture encoding apparatus shown in the third and fourth embodiments.

Firstly, the method of storing the picture in the memory at the time of decoding the encoded signal encoded by the picture encoding apparatus shown in the third embodiment is explained.

The picture decoding apparatus 150 judges whether or not the decoded picture outputted from the addition unit Add in the picture decoding apparatus 150 is to be stored in the picture memory PicMem2 based on the instruction indicated in the memory control command MMCO.

When storing the decoded picture in the picture memory, the picture memory area firstly released is obtained and the decoded picture is stored in the obtained area.

Here, the memory area in which the picture is decoded and stored at the earliest time or the memory area in which the picture with the earliest display time is stored instead of the memory area that is released at the earliest time may be allocated as an area to store the picture. For, there is a high possibility that the pictures stored in these memory areas are already displayed.

Since it is a system that manages the information on display time, it is difficult to obtain the display time depending on a method to fabricate a picture decoding apparatus. It is highly possible that the picture with the earliest display time is stored in the area in which the picture is stored at the earliest time rather than in the one in which the picture is stored at the later time. It is with high possibility that the picture stored at the earliest time is already displayed since it is natural that the picture with early display time is already displayed. Therefore, there is a high possibility that the picture that is not displayed yet is not overwritten when the decoded picture is stored in the area in which the picture stored at the earliest time has been stored. When the earliest time corresponds with the earliest time when the picture is encoded, whether the picture is encoded at the earliest time, for instance, can be judged by the prediction structure and the decoding order of the picture.

These earliest times are not necessarily based on time and may be the earliest time according to an order. For instance, it may be the earliest time according to a display order. For example, it is highly possible that a picture whose display order is the earliest is already displayed and a memory area storing such picture can be reused in turn as a storing area in the memory regardless of whether it is already displayed or not. Normally, the intervals of displaying pictures are regular, therefore, the order of displaying pictures may be considered as the display time.

Thus, overwriting of a new picture onto the picture that is not yet displayed can be prevented so that the latter picture can be outputted for display from the area that is already released but not overwritten at the display time. Also, the picture that needs to be stored for display can be stored without requiring an unnecessary memory.

The processing of storing the picture which needs to be stored for display can be carried out regardless of whether the picture stored in the picture memory PicMem2 is already displayed or not. When the earliest time indicates the earliest time in display time, whether or not the picture is stored at the earliest time can be judged by the display picture control unit DispPicCtrl managing the information on whether or not the picture is displayed.

The following describes a method of storing a picture in the memory when decoding the encoded signal encoded by the picture encoding apparatus shown in the fourth embodiment.

The picture decoding apparatus 150 judges whether or not the decoded picture outputted from the addition unit Add mentioned above of the picture decoding method 150 is to be stored in the picture memory PicMem2 based on the instruction indicated in the memory control command MMCO.

In the case of storing the decoded picture in the picture memory, the picture memory firstly released is obtained and the decoded picture is stored in the obtained area.

Since it is a system that manages the information on display time, it is difficult to obtain the display time depending on a method to fabricate a video decoding apparatus. It is highly possible that the picture with the earliest display time is stored in the area firstly released rather than in the area released at the later time. Namely, it is likely that the picture firstly released is already displayed. Therefore, there is a high possibility that the picture that is not yet displayed is not overwritten by storing the decoded picture in the picture area firstly released.

Whether the picture area is a firstly released picture area or not can be judged by referring to the information on whether or not each picture area is released, for instance, "used (usable as a reference picture)" or "unused (no longer used as a reference picture)", that is stored in the picture memory PicMem2 according to the memory control command MMCO, including the order of releasing the pictures. Or, the usage of the picture area can be fixed beforehand to a predetermined procedure in order to judge whether the picture area is the one that is firstly released according to the procedure. For example, this can be judged by the picture memory PicMem2 functioning as a memory using a first-in first-out (FIFO) method by which the contents of record with old recording time are sequentially discarded when the new data is recorded so that the latest pictures of a fixed number of frames (or number of pictures) are always stored.

Thus, overwriting of a new picture to a picture that is not yet displayed can be prevented and the picture can be outputted for display from the area that is already released but not overwritten at the display time.

The display unit Disp may be installed in the exterior of the picture decoding apparatus 150 instead of being included in it so that the picture decoding apparatus 150 may send only the data necessary for displaying a picture at the display unit Disp.

Here, an operation of the picture decoding apparatus 150 when the picture size is modified, as already explained in the second embodiment, is illustrated. However, the operation is the same as the one described in the third and the fourth embodiments, and therefore, the explanation is abbreviated.

A method corresponding to the first method in the case in which the picture size is modified shown in the second embodiment is that the picture decoding apparatus 150 releases a whole area in the memory including the area for reference in which the reference picture is stored and the area for display in which the picture for display is stored and performs initialization when receiving a command to modify the picture size.

Figure 10:
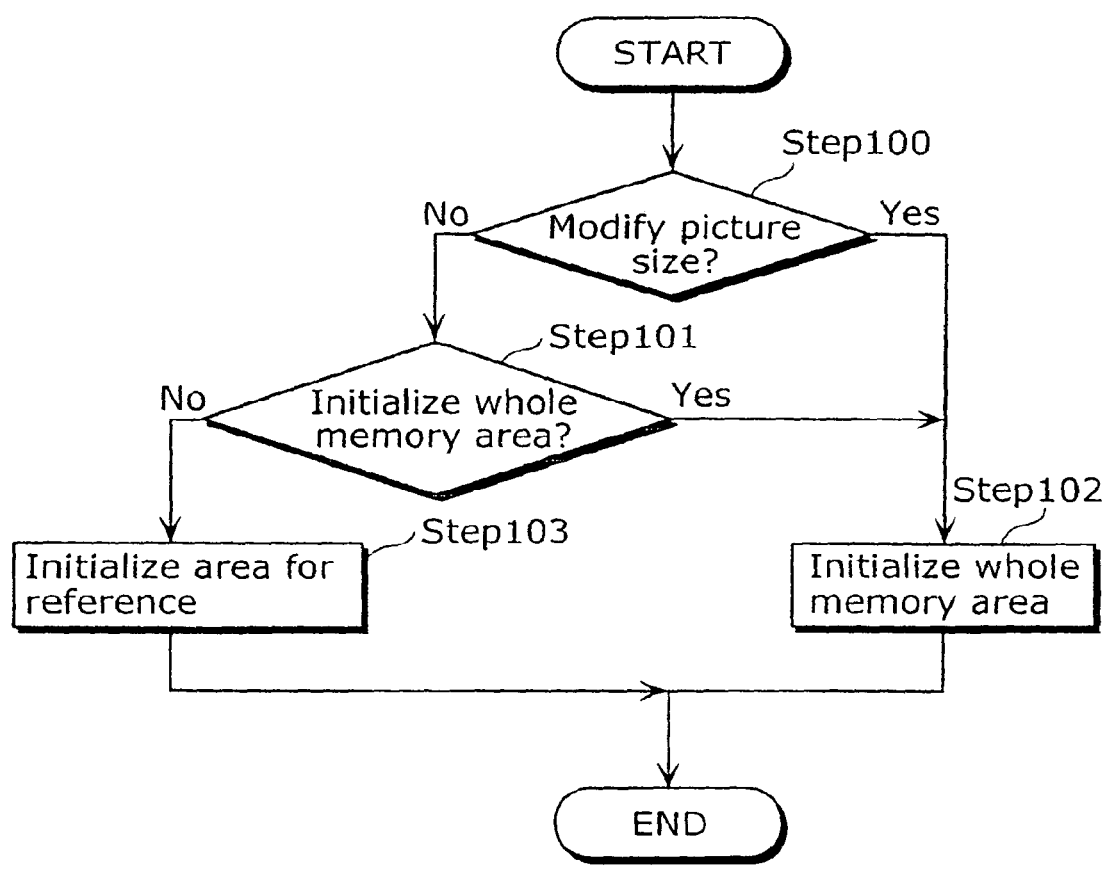
FIG. 10 is a flowchart showing an operation of the picture decoding apparatus of the present invention described in the fifth embodiment.

FIG. 10 is a flowchart showing an operation of the picture encoding apparatus 150.

The picture encoding apparatus 150 judges whether or not a signal outputted from the picture size modification detection unit PicSizeDet indicates a modification of a picture size (Step 100). When it does (Yes in Step 100), the picture encoding apparatus 150 releases a whole memory area of the picture memory PicMem2 (as a reusable state), initializes it (Step 102) and ends the processing.

When the picture size is not modified (No in Step 100), the picture decoding apparatus 150 judges whether or not the memory control command MMCO outputted from the variable length decoding unit VLD indicates the release (initialization) of the whole memory area in the picture memory PicMem2 (Step 101) and if it does (Yes in Step 101), releases the whole memory area (Step 102), and if not (No in Step 101), releases only the area for reference in which the reference picture is stored (Step 103) and ends the processing.

Thus releasing the whole area of the memory prevents the fragmentary use of the memory caused by the mixture of the pictures of different sizes and thereby the deterioration in the usability of the memory can be reduced.

Next, an operation of the picture decoding apparatus 150 corresponding to the second method in the case of the modification of the picture size shown in the second embodiment is explained.

In the case of modifying the picture size, the methods are switched from one to the other: a method of releasing the whole area of the memory or a method of releasing only the area for reference in which the reference picture is stored and displaying the displayable picture out of the pictures that are not yet displayed with the judgment made by the picture decoding apparatus 150.

As described in the second embodiment, the instruction information (flag) indicating either to release the whole memory area or to release only the area for reference is contained in the memory control command MMCO in the stream Str outputted from the picture encoding apparatus 100.

The picture decoding apparatus 150 determines either of the two methods described above based on the instruction information contained in the memory control command MMCO.

Figure 11:
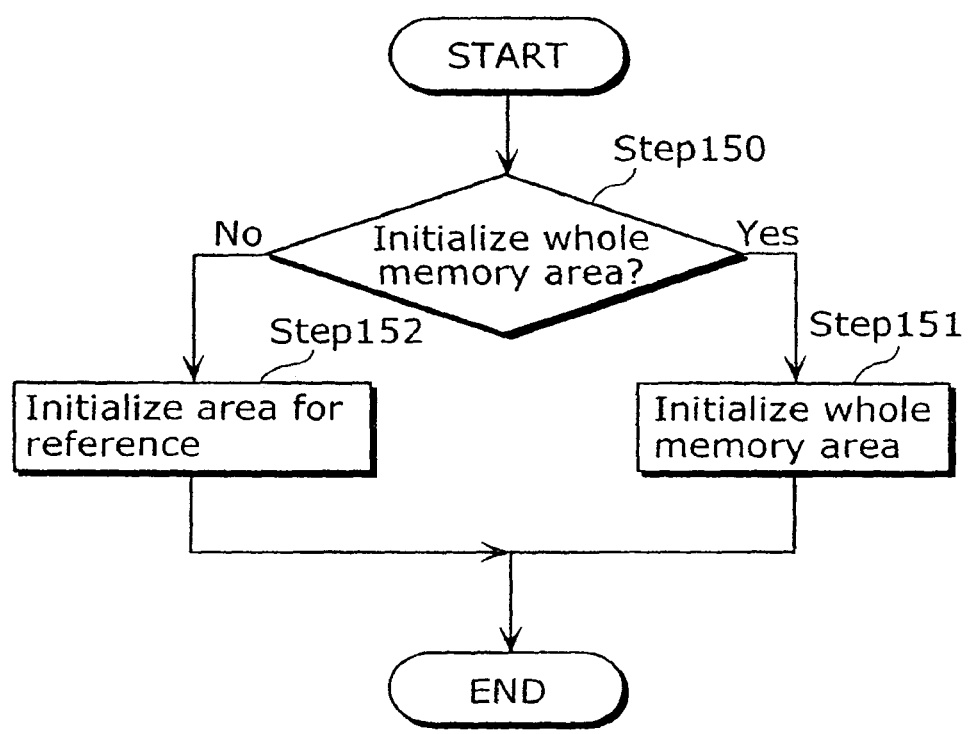
FIG. 11 is a flowchart showing another operation of the picture decoding apparatus of the present invention described in the fifth embodiment.

FIG. 11 is a flowchart showing a determination operation.

Firstly, the picture decoding apparatus 150 judges whether or not the instruction information (flag) indicates the initialization of the whole area of the memory (Step 150). When it indicates the initialization of the whole area (Yes in Step 150), the picture decoding apparatus 150 releases the whole area, for initialization, including the area for display storing the picture for display that is not yet displayed (Step 151), and otherwise (No in Step 150), releases only the area for reference for initialization (Step 152).

When the instruction information (flag) does not indicate the initialization of the whole area, the picture decoding apparatus 150 releases only the area for reference. As for the picture that is not displayed yet and stored in an area other than the area for reference, the picture decoding apparatus 150 judges the picture as such and displays a displayable picture.

The following describes the operation of the picture decoding apparatus 150 in the case of initializing only the area for reference, with reference to a flowchart.

Figure 12:
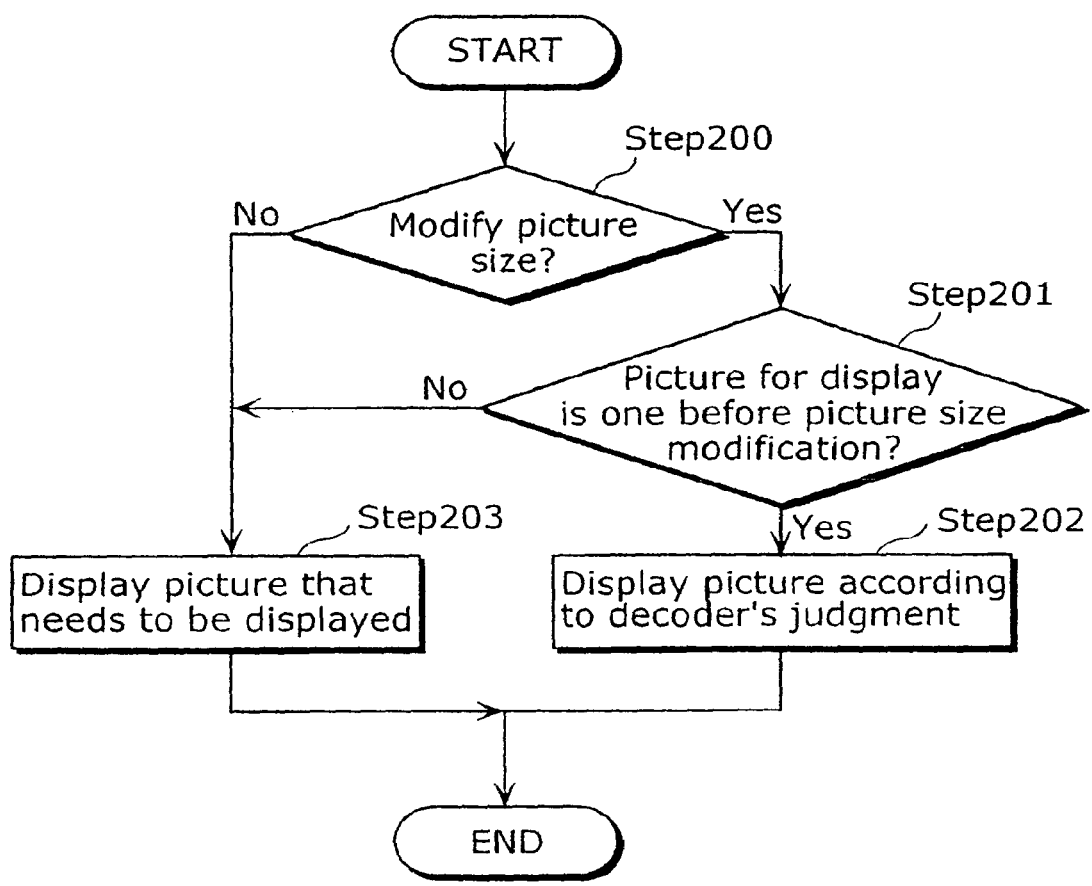
FIG. 12 is a flowchart showing yet another operation of the picture decoding apparatus of the present invention described in the fifth embodiment.

FIG. 12 is a flowchart showing an operation of the picture decoding apparatus 150 (decoder).

The picture decoding apparatus 150 judges whether or not the signal outputted from the picture size modification detection unit PicSizeDet indicates a modification of a picture size (Step 200). Unless it indicates the modification of the picture size (No in Step 200), the picture decoding apparatus 150 displays the picture to be displayed that is not yet displayed stored in the area for display (Step 203).

Meanwhile, when the signal indicates the modification of the picture size (Yes in Step 200) the picture decoding apparatus 150 determines whether or not the picture for display stored in the area for display is one before the modification of the size takes place (Step 201). When it is not the case (No in Step 201), the picture decoding apparatus 150 displays the picture to be displayed that is not yet displayed (Step 203). When it is the case (Yes in Step 201), the picture decoding apparatus 150 judges whether or not the picture for display is displayable or not and displays it based on the judgment (Step 202)

The following describes an operation of the picture decoding apparatus 150 for a judgment on whether the picture can be displayed or not.

Figure 13:
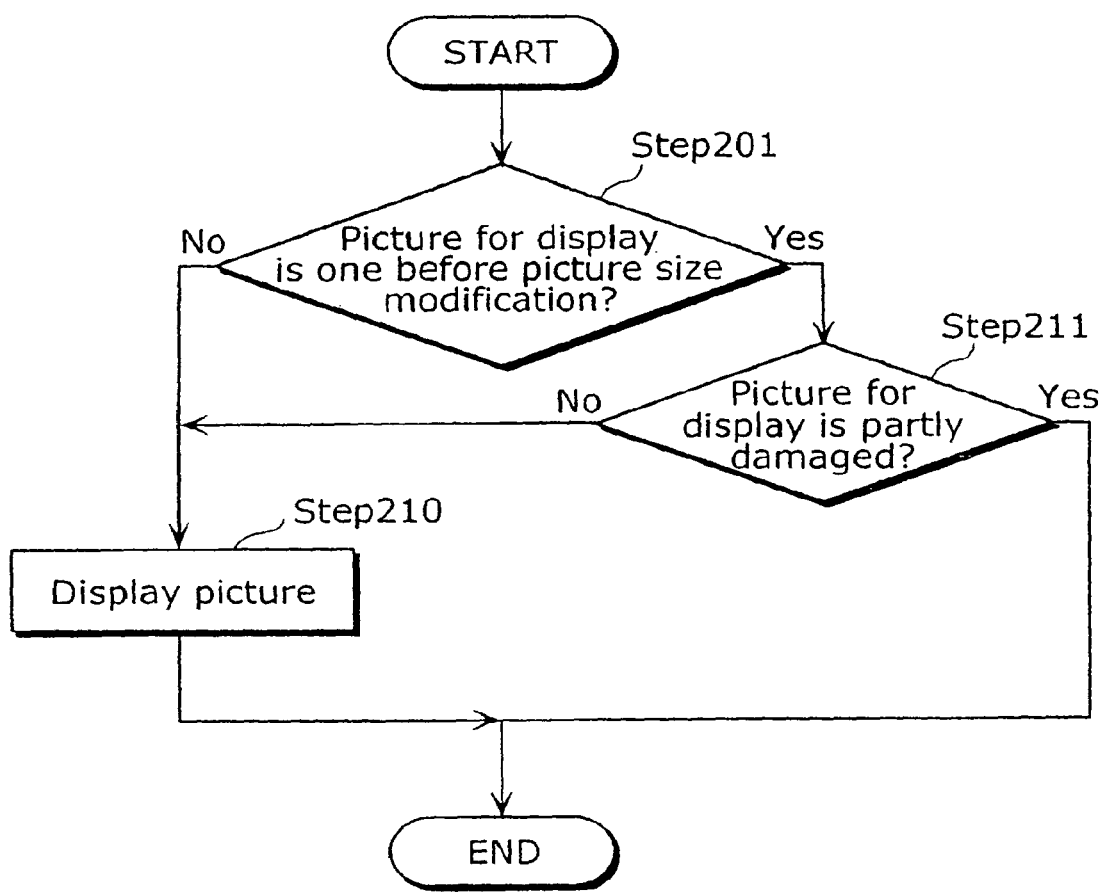
FIG. 13 is a flowchart showing another operation of the picture decoding apparatus of the present invention described in the fifth embodiment.

FIG. 13 is a flowchart showing the operation of the picture decoding apparatus 150 with regard to a display of the picture.

In FIG. 13, the same marks are used for the same processing as described in FIG. 12.

The picture decoding apparatus 150 judges whether or not the picture for display stored in the area for display is one before the modification of the size takes place (Step 201). When the picture is not one before the modification takes place (No in Step 201), the picture decoding apparatus 150 displays the picture. On the other hand, when the picture is one before the modification takes place (Yes in Step 201), the picture decoding apparatus 150 determines whether the picture to be displayed is damaged or not (Step 211). When the picture is not damaged (No in Step 211) the picture is considered as displayable and thereby displayed (Step 210). When it is damaged (Yes in Step 211), the preceding picture, for instance, is displayed instead. Here, not being damaged means that the picture to be displayed is not overwritten even partially, so that new picture data is stored. In this way, the picture decoding apparatus 150 judges whether or not the picture to be displayed is damaged, determines the undamaged picture as displayable and displays it.

Thus, as explained in the flowcharts of FIGS. 11, 12 and 13, the picture decoding apparatus 150 displays the picture that is not displayed yet according to the instruction information (flag) indicating whether or not to initialize the whole area of the memory when the modification of the picture size takes place.

Owing to the picture decoding method of the picture decoding apparatus 150 as described above, an appropriate decoding is realized by switching either to initialize the whole area of the memory or to initialize only the area for reference and display the picture for display that is not yet displayed even when the modification of the picture size is performed. Namely, when the free area in the memory is small, for instance, the whole area in the memory is initialized for reuse whereas when it is large, the case can be handled flexibly by allowing the display of the picture that is not yet displayed after initializing only the area for reference.

Sixth Embodiment

The following terms are used in a sixth embodiment. Namely, a reference picture buffer is an area combining an area for reference and the one for display in the picture memory PicMem2 in a picture encoding apparatus. A virtual display delay buffer is a virtual buffer for each picture for display to be stored in the area for display that is retained in the picture memory PicMem2 in the picture encoding apparatus and stores temporal reference numbers of the pictures for display (picture numbers or the like). A reference memory buffer is an area for reference in the picture memory PicMem2 in a picture decoding apparatus. A post decoder buffer is an area for display in the picture memory PicMem2 in the picture decoding apparatus. The temporal reference numbers are the numbers that are assigned for the pictures according to the order of display time and may be an equivalent of the picture time Time.

Firstly, the explanation starts with the picture encoding apparatus. The virtual display delay buffer is used to limit the maximum number of the reference pictures used for predictive encoding performed by the picture encoding apparatus.

Figure 14:
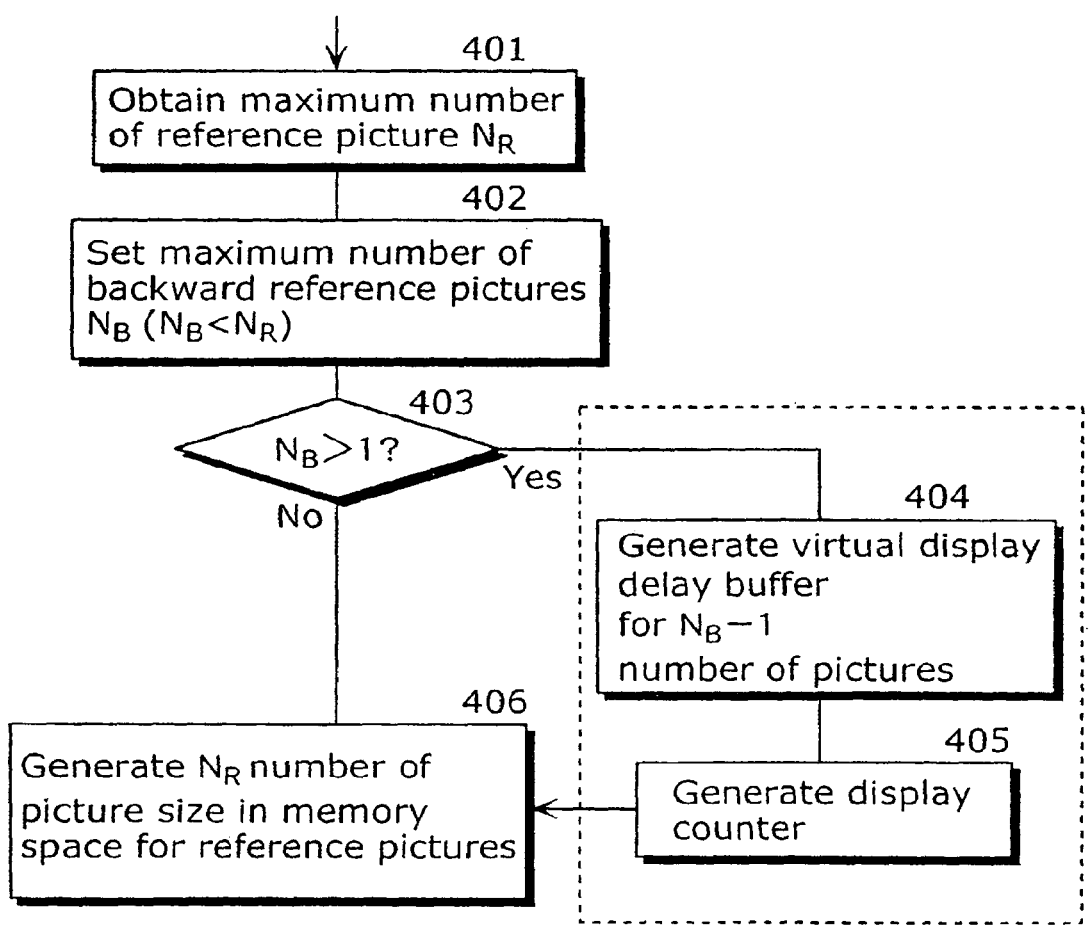
FIG. 14 is a block diagram showing a usage of a virtual display delay buffer of a picture encoding apparatus.

FIG. 14 shows processing of determining a relationship between the virtual display delay buffer and the maximum number of the backward reference pictures. Each module in FIG. 14 represents a function block or a processing step of a picture structure determination unit PicStruct, a reference picture control unit RefPicCtrl and a display picture control unit DispPicCtrl. As shown in the diagram, the maximum number of the reference pictures allowed, $N_R$ for this profile and level, is determined in module 401. This value is defined for each profile and level and thereby the encoder encodes the value of profile/level, an equivalent of $N_R$, as information on a stream and a decoder obtains $N_R$ according to the value of profile/level in the stream. The picture encoding apparatus then sets the maximum number of backward reference pictures, $N_B$, to be optimal for encoding a video sequence in module 402. The size of the virtual display delay buffer can be determined based on this $N_B$ value. When the $N_B$ is less than 2, the virtual display delay buffer is not required. However, when $N_B$ is greater than or equal to 2, a virtual display delay buffer that can store $N_B-1$ number of pictures is created in module 404. The information on the picture stored in the virtual display delay buffer is retained in the memory or in any register. This virtual display delay buffer does not require a large physical memory space in the picture encoding apparatus. This is because only the descriptions of the reference pictures (picture numbers or the like) for identifying not a whole part of the reconstructed (decoded) picture but which reconstructed picture are stored in the virtual display delay buffer since the judgment to see which picture is stored in the virtual display delay buffer for its display unless the picture decoded by the picture decoding apparatus needs to be displayed (outputted). Besides the virtual display delay buffer, a display counter is created in module 405 and the value is retained either in the memory or in any register. The display counter is used to judge whether to remove an unnecessary picture from the virtual display delay buffer. The picture encoding apparatus then generates a picture size for $N_R$ number of reference pictures in the memory space based on the profile and level definition.

$$\text{Maximum virtual display delay buffer size} = N_B - 1 \quad (1),$$

where $N_B < N_R$

Figure 15:
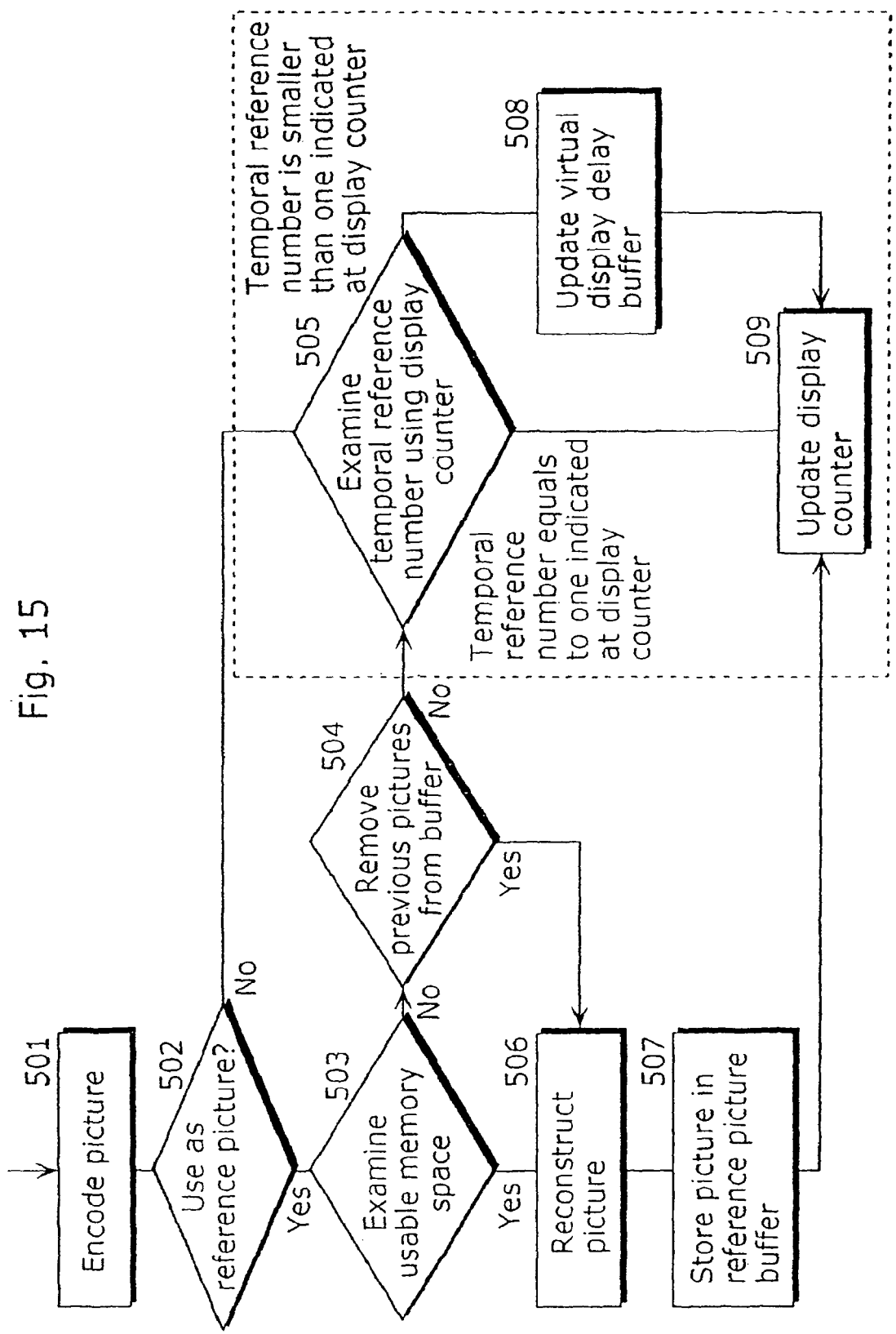
FIG. 15 is a block diagram showing a processing of post decoder buffer operation for encoding according to the present invention.

FIG. 15 shows the post encoding processing in the picture encoding apparatus, that is, a processing of storing a picture decoded after being encoded (referred to as an encoded picture or simply a picture) in the reference memory buffer. The module in the diagram represents a function block or a processing step in the reference picture control unit RefPicCtrl and the display picture control unit DispPicCtrl. After a single picture is encoded in module 501, whether or not the picture is to be used as a reference picture is determined in module 502. When the picture is a reference picture, the maximum number of the possible reference pictures is calculated based on equation (2).

$$N\text{Max} = N_R - Fv \quad (2)$$

Here, NMax represents the maximum number of the possible reference pictures whereas $N_R$ represents the maximum number of the reference pictures allowed in the profile and level definition. Fv represents a virtual display delay buffer fullness, that is, the number presently used out of the size of the virtual display delay buffer ($N_B-1$).

When the number of the reference pictures in the reference picture buffer is less than NMax, the encoded picture is reconstructed (decoded) in module 506 and stored in the reference picture buffer in module 507. When there isn't sufficient space, the picture encoding apparatus retains a necessary area in the reference picture buffer by removing certain unused reference pictures (no longer used as reference pictures) from the buffer, as shown in module 504. When there are no unused reference pictures to be removed from the buffer, the encoded picture is not used as a reference picture. When the encoded picture is not a reference picture, the temporal reference number of the encoded picture is compared with the one indicated at the display counter in module 505. When the temporal reference number of the non-reference picture is less than the one indicated at the display counter, the virtual display delay buffer is updated in module 508. In module 508, the virtual display delay buffer removes the picture having the temporal reference number equal to or earlier than the one indicated at the display counter and adds the temporal reference number of the current non-reference picture into the buffer. The number of the pictures in the virtual buffer having the temporal reference number less than the one indicated in the display counter becomes the fullness of the buffer. The display counter only starts updating operation with initiative when the number of the encoded picture is equal to $N_B$ or when the virtual display counter is full, no matter which may be earlier. After that, the display counter is updated for every picture that is encoded in module 509.

Figure 16:
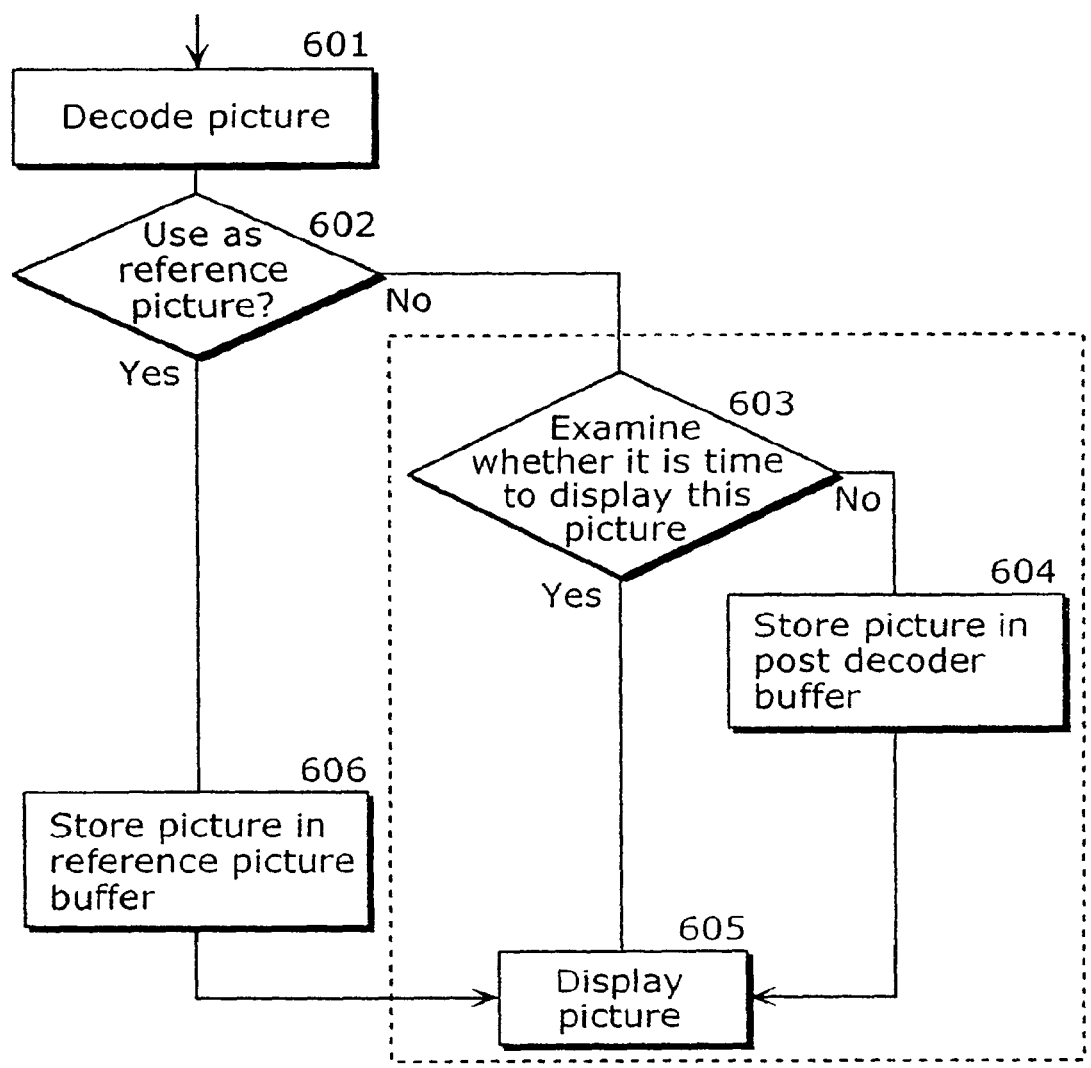
FIG. 16 is a block diagram showing a processing of post decoder buffer operation for decoding according to the present invention.

FIG. 16 shows the post decoding processing in the picture decoding apparatus, that is, processing of storing a picture decoded by the picture decoding apparatus (referred to as a decoded picture or simply a picture) in the reference picture buffer. The modules in the diagram show the function blocks or the processing steps in the display picture control unit DispPicCtrl. A picture is decoded in module 601. In module 602, the picture decoding apparatus determines whether or not the picture needs to be stored as a reference picture. If the decoded picture is to be stored as a reference picture, it is stored in the reference picture buffer in module 606. Otherwise, the picture decoding apparatus examines whether it is time to display (output) this picture in module 603. If the time has not come yet for the picture to be displayed (outputted), the picture is stored in the post decoder buffer in module 604 until its display time. Both the post decoder buffer and the reference picture buffer share physically the same memory area. In other words, each area of the same memory can be used as a reference picture buffer for some occasions and as a post decoder buffer for other occasions.

In module 605, the picture decoding apparatus then determines a picture to be displayed (outputted) either from the reference picture buffer or the post decoder buffer based on the display timing. Once a picture from the post decoder buffer is displayed (outputted), it is removed from the buffer. On the other hand, a reference picture is only to be removed from the reference picture buffer or shifted to the post decoder buffer when the stream indicates that the reference picture is no longer used for reference.

Figure 17:
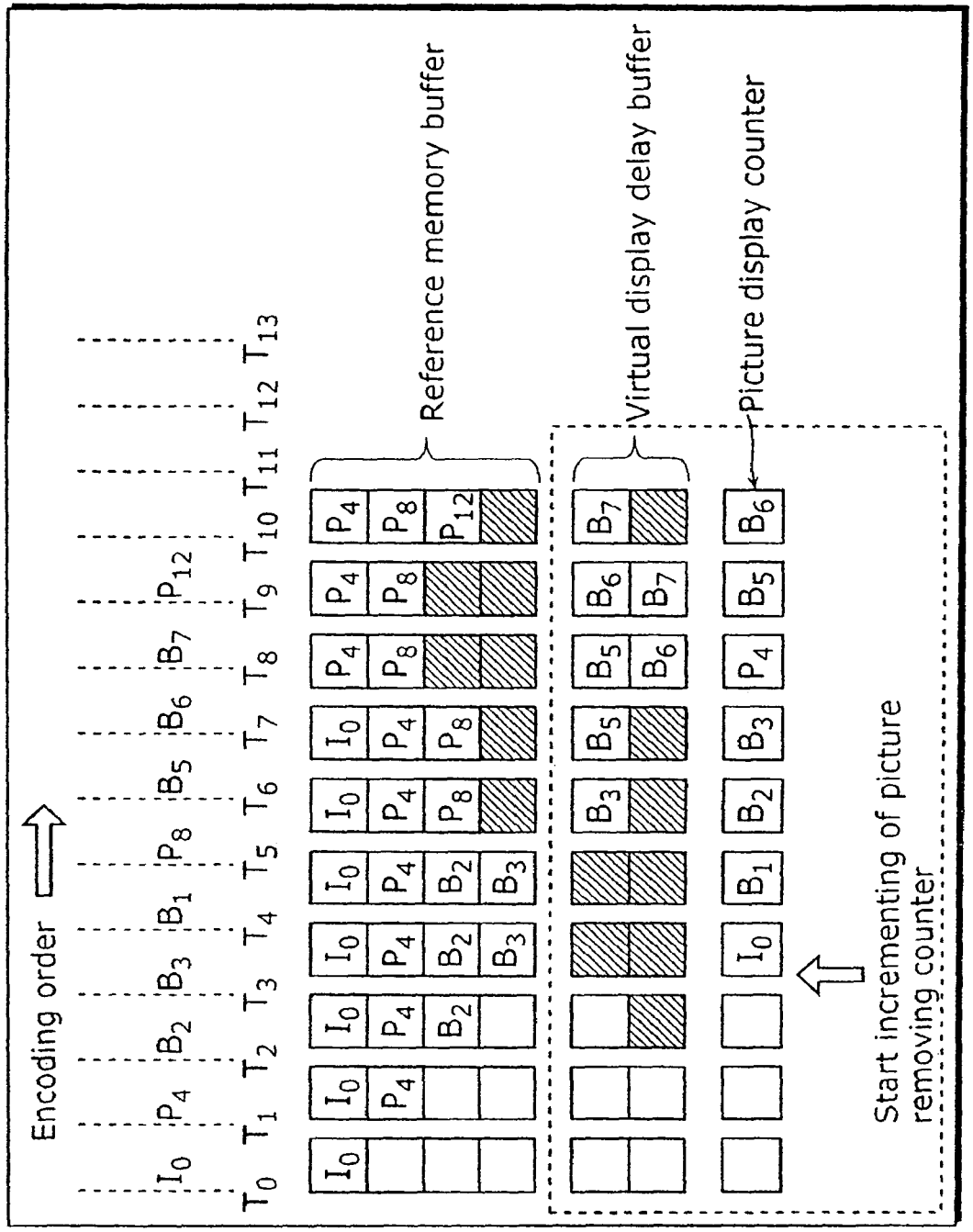
FIG. 17 is an example of using the virtual display delay buffer of the picture encoding apparatus for limiting the maximum number of the reference pictures.

FIG. 17 is an example of a method using a virtual display delay buffer for determining the maximum number of reference pictures at each picture interval. In this example, the maximum number of reference pictures allowed, $N_R$, shall be 4. The picture encoding apparatus sets the maximum number of backward reference pictures, $N_B$, to be 3. Thus, virtual display delay buffer in which two pictures are storable is generated (the area is retained). The display counter is used for storing and updating the temporal reference number of the picture to be virtually displayed (outputted). In the reference memory buffer shown in the diagram, the vacant area shows that the area is vacant, the area described with its picture type and the number shows that the picture for reference is stored, and the hatched area shows that the picture for display is stored. Also, in the virtual display delay buffer, the vacant area shows that the area is vacant, the area described with its picture type and the number shows that the temporal reference number of the picture for display in the reference memory buffer is stored and the hatched area shows that the reference memory buffer does not have a storing area for the picture for display. The virtual display delay buffer whose number corresponds to the number of the hatched area in the reference memory buffer stores the temporal reference numbers of the pictures for display.

As shown in the diagram, the pictures B2 and B3 are used as reference pictures and thereby they are stored in the reference memory buffer together with I0 and P4, and the display counter starts updating after the picture B3 is encoded. At time T6, B5 is not used as a reference picture; however, this is because the temporal reference number is greater than the one indicated at the display counter and needs to be updated by the virtual display delay buffer. Therefore, the fullness of the virtual display delay buffer Fv at that time is 1 and the maximum number of possible reference pictures NMax is 3.

Similarly at time T7, the picture B6 needs to be updated by the virtual display delay buffer whereas B5 cannot be removed yet due to its temporal reference number being greater than the one indicated at the display counter. Thus, NMax at that time indicates 2. The reference picture I0 has to be removed from the reference memory buffer due to the insufficient memory. B7 at that time then can be predicted only with the use of P4 and P8.

Figure 18:
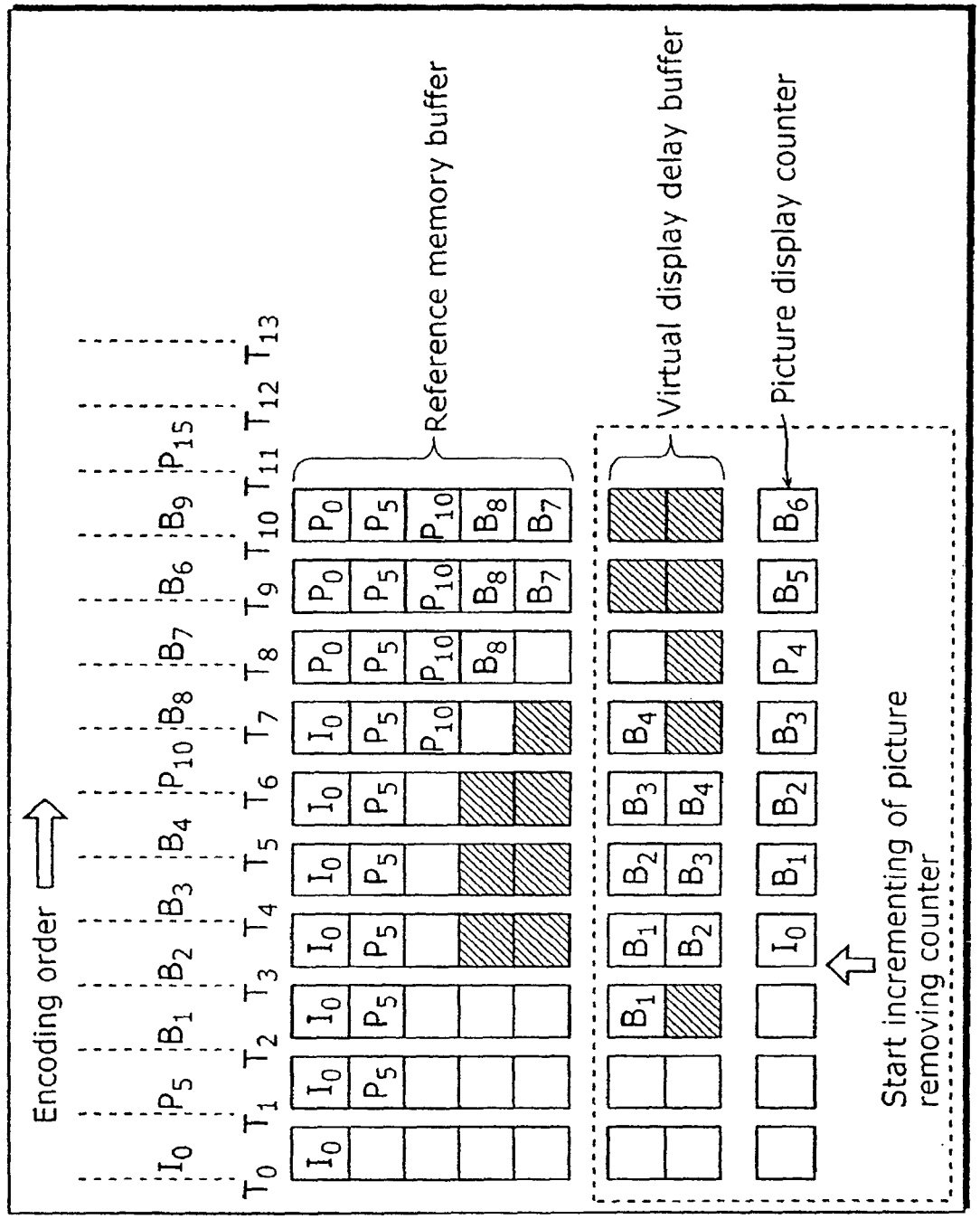
FIG. 18 is an example of using the virtual display delay buffer for deciding the time to display a first picture.

FIG. 18 shows an example in which the display counter is firstly incremented using the virtual display delay buffer. $N_R$ shall be 5 in the example. The picture encoding apparatus sets the maximum number of multiple backward reference pictures $N_B$ to be 3. Thus a virtual display delay buffer in which two pictures are storable is generated.

As shown in the diagram, B1, B2, B3 and B4 are not used for reference pictures whereas B7 and B8 are. B1 and B2 are therefore stored in the virtual display delay buffer at time T3 in order to wait for display. Since the virtual display delay buffer is full at time T3, the display counter starts updating at time T3. The reason why the display counter needs to wait at least until the virtual display delay buffer becomes full before it can start updating is that it needs to handle the reordering of the B-pictures that is likely to occur in the picture decoding apparatus.

As shown in FIG. 17, the picture decoding apparatus sometimes uses a part of the reference picture buffer as a post decoder buffer. The picture decoding apparatus therefore operates the reference picture buffer based on a fixed physical memory size of the reference picture buffer so that some parts of the reference picture buffer are used for reference pictures and the rest is used as the post decoder buffer. For example, at time T3, the whole reference picture buffer is used to store reference pictures whereas at time T7, only two areas of the reference picture buffer are used to store the reference pictures of P4 and P8. The rest is used to store post decoder pictures B5 and B6.

The maximum number of the reference pictures to be used at the picture decoding apparatus side is defined in the profile and level definition for the picture encoding apparatus. The picture encoding apparatus therefore can use up to the maximum number of the reference pictures defined by the profile and level. Thus, it is required that the picture encoding apparatus controls the reference pictures and performs encoding so that the same operation can be realized (the number of reference pictures does not surpass the predetermined value) when the picture decoding apparatus operates based on the constraint conditions.

Similarly, the picture decoding apparatus has the same number of reference pictures as the picture encoding apparatus does. In addition, additional memory space is needed for the post decoder buffer. The maximum number of post decoder pictures is defined by equation (3).

$$N_P = N_R - 2 \quad (3)$$

Here, $N_P$ presents the maximum number of post decoder pictures whereas $N_R$ presents the maximum number of the reference pictures defined by the profile and level definition.

The maximum number of post decoder pictures shall be therefore considered in the design of the picture decoding apparatus so that the picture decoding apparatus complies with the profile and level definition. The maximum number of the post decoder pictures can be either calculated with the use of the equation (3) or specified in the profile and level definition. Once the maximum number of post decoder pictures is specified in the profile and level definition, the maximum number of backward prediction pictures can be calculated based on equation (4).

$$N_B = N_P + 1 \quad (4)$$

Here, $N_B$ presents the maximum number of backward prediction pictures in the reference picture buffer. In the present embodiment, $N_B$ presents the minimum memory requirements required by the picture decoding apparatus so as to decode a stream complying with the profile and level definition.

It is possible to limit the number of pictures used for backward prediction in order to reduce the number of the additional post decoder pictures added to the reference picture buffer by the side of the picture decoding apparatus. For example, when the maximum number of the pictures used for backward prediction is limited to 2, only one additional post decoder picture is required to be added to the reference picture buffer, which can prevent the allocation of unnecessary physical memory space for the post decoder pictures on the side of the picture decoding apparatus.

Seventh Embodiment

Furthermore, it is possible to easily perform the processing shown in the above embodiments in an independent computing system by recording a program for realizing the picture encoding method and the picture decoding method shown in the above-mentioned embodiments onto a storage medium such as a flexible disk.

Figure 19A:
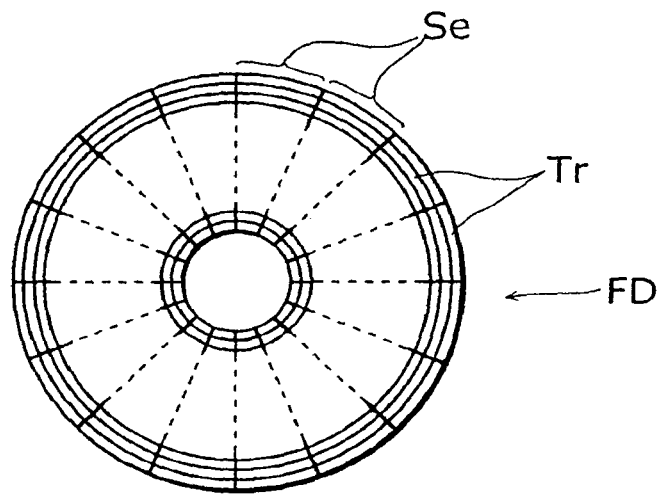
FIGS. 19A, 19B and 19C are illustrations of a storage medium in order to store a program for realizing the picture encoding method and the picture decoding method of each embodiment in a computing system, described in a seventh embodiment.
Figure 19B:
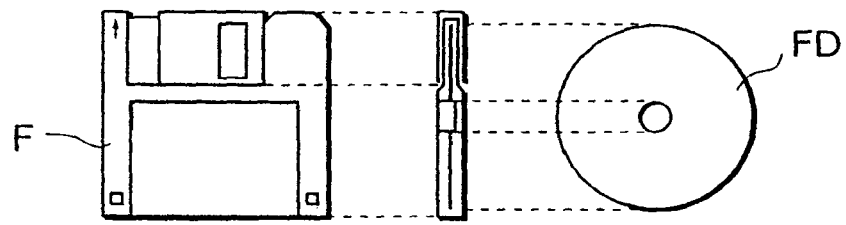
Figure 19C:
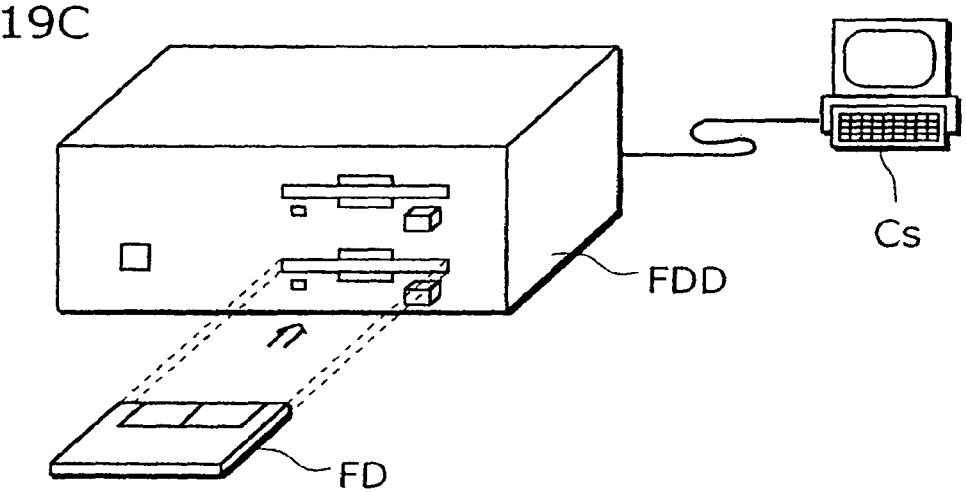

FIGS. 19A, 19B and 19C are illustrations for realizing the picture encoding/decoding method of the above embodiments using a program recorded onto a storage medium like a flexible disk.

FIG. 19B shows a full appearance of a flexible disk, its structure at cross section and the flexible disk itself, whereas FIG. 19A shows an example of a physical format of the flexible disk as a main body of a storing medium. A flexible disk FD1 is contained in a case F, a plurality of tracks Tr are formed concentrically from the periphery to the inside on the surface of the disk, and each track is divided into 16 sectors Se in the angular direction. Therefore, as for the flexible disk storing the above-mentioned program, data as the aforementioned program is stored in an area assigned for it on the flexible disk FD1.

FIG. 19C shows a structure for recording and reading out the program on the flexible disk FD1. When the program is recorded on the flexible disk FD1, the computing system Cs writes in data as the program via a flexible disk drive FDD. When the picture encoding method and the picture decoding method for realizing the picture encoding method and the picture decoding method as the program on the flexible disk are constructed in the computing system, the program is read out from the flexible disk by the flexible disk drive FDD and then transferred to the computing system Cs.

The above explanation is made on an assumption that a storing medium is a flexible disk, but the same processing can also be performed using an optical disk. In addition, the storing medium is not limited to a flexible disk and an optical disk, but any other medium such as an IC card and a ROM cassette capable of recording a program can be used.

Eighth Embodiment

The following is an explanation of the applications of the picture encoding method as well as the picture decoding method as shown in the above-mentioned embodiments, and a system using them.

Figure 20:
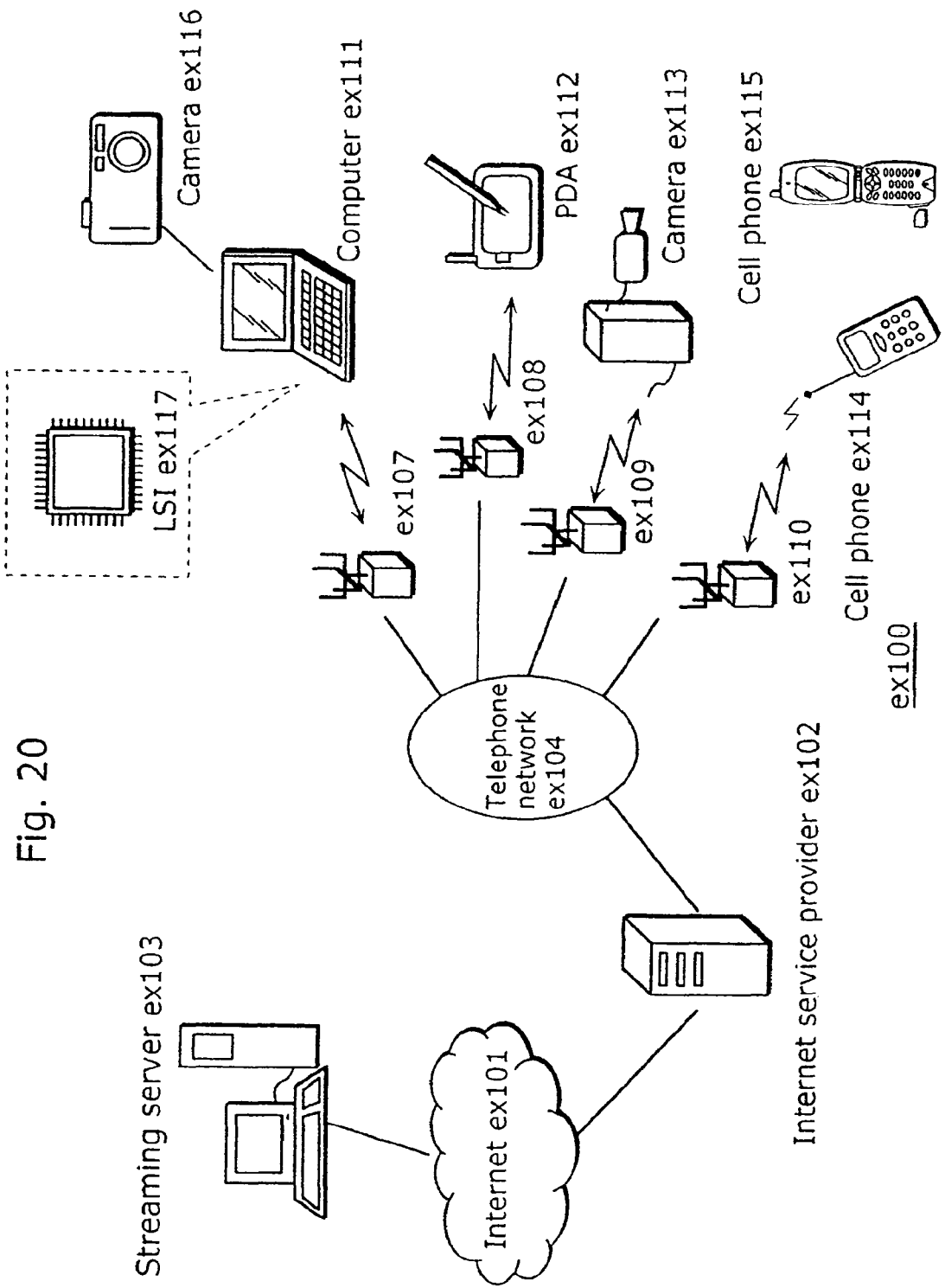
FIG. 20 is a block diagram showing an overall structure of a content supply system described in an eighth embodiment.

FIG. 20 is a block diagram showing an overall configuration of a content supply system ex100 for realizing content distribution service. The area for providing communication service is divided into cells of desired size, and cell sites ex107~ex110 which are fixed wireless stations are placed in respective cells.

This content supply system ex100 is connected to devices such as Internet ex101, an Internet service provider ex102, a telephone network ex104, as well as a computer ex111, a PDA (Personal Digital Assistant) ex112, a camera ex113, a cell phone ex114 and a cell phone with a camera ex115 via the cell sites ex107~ex110.

However, the content supply system ex100 is not limited to the configuration as shown in FIG. 20 and may be connected to a combination of any of them. Also, each device may be connected directly to the telephone network ex104, not through the cell sites ex107~ex110.

The camera ex113 is a device capable of shooting video such as a digital video camera. The cell phone ex114 may be a cell phone of any of the following system: a PDC (Personal Digital Communications) system, a CDMA (Code Division Multiple Access) system, a W-CDMA (Wideband-Code Division Multiple Access) system or a GSM (Global System for Mobile Communications) system, a PHS (Personal Handyphone System) or the like.

A streaming server ex103 is connected to the camera ex113 via the telephone network ex104 and also the cell site ex109, which realizes a live distribution or the like using the camera ex113 based on the coded data transmitted from the user. Either the camera ex113 or the server which transmits the data may code the data. Also, the picture data shot by a camera ex116 may be transmitted to the streaming server ex103 via the computer ex111. In this case, either the camera ex116 or the computer ex111 may code the picture data. An LSI ex117 included in the computer ex111 or the camera ex116 actually performs encoding processing. Software for encoding and decoding pictures may be integrated into any type of storage medium (such as a CD-ROM, a flexible disk and a hard disk) that is a recording medium which is readable by the computer ex111 or the like. Furthermore, a cell phone with a camera ex115 may transmit the picture data. This picture data is the data encoded by the LSI included in the cell phone ex115.

The content supply system ex100 encodes contents (such as a music live video) shot by a user using the camera ex113, the camera ex116 or the like in the same way as shown in the above-mentioned embodiments and transmits them to the streaming server ex103, while the streaming server ex103 makes stream distribution of the content data to the clients at their requests. The clients include the computer ex111, the PDA ex112, the camera ex113, the cell phone ex114 and so on capable of decoding the above-mentioned encoded data. In the content supply system ex100, the clients can thus receive and reproduce the encoded data, and can further receive, decode and reproduce the data in real time so as to realize personal broadcasting.

When each device in this system performs encoding or decoding, the picture encoding method or the picture decoding method shown in the above-mentioned embodiments can be used.

A cell phone will be explained as an example of the device.

Figure 21:
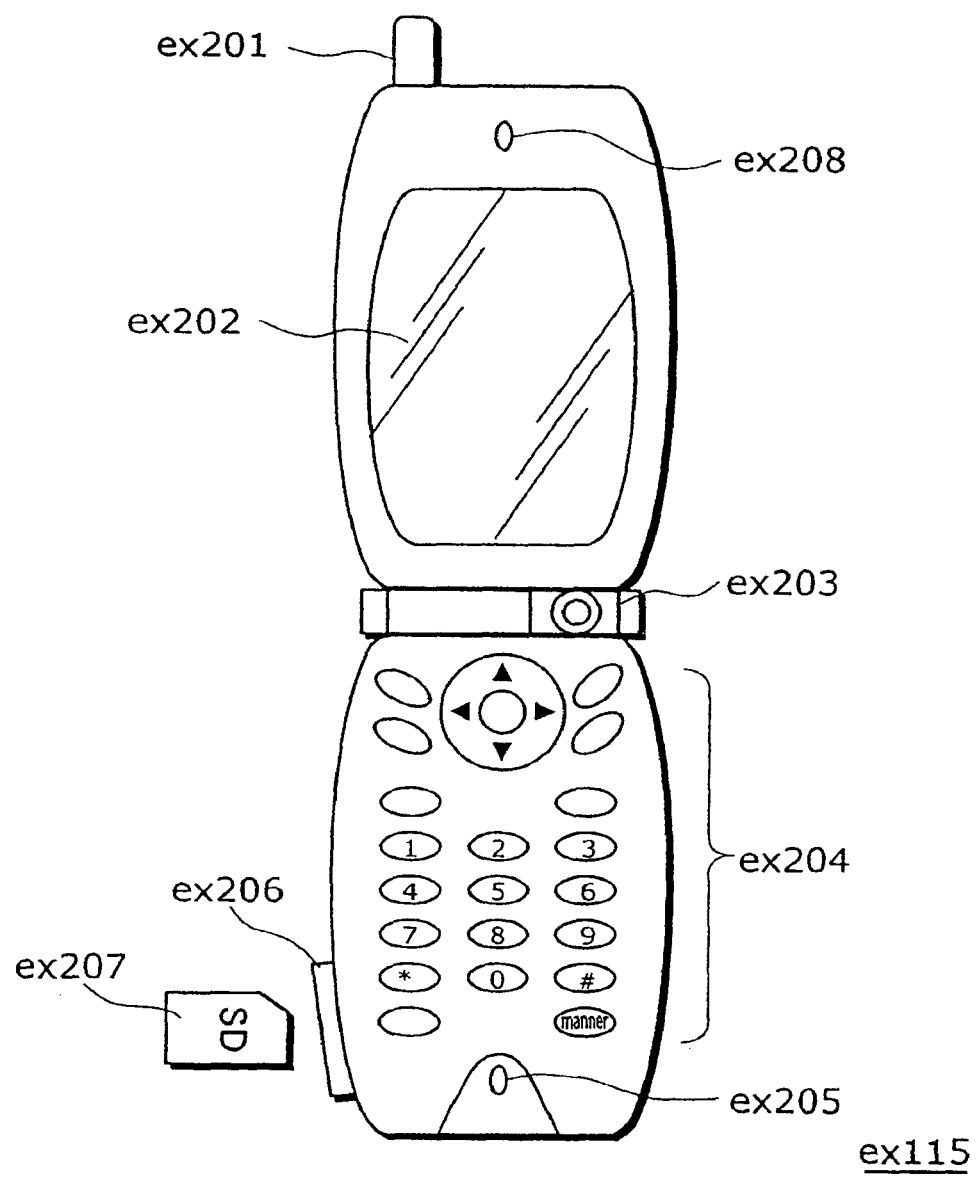
FIG. 21 is an outline view showing an example of a cell phone using the picture encoding/decoding method of the present invention described in the eighth embodiment.

FIG. 21 is a diagram showing the cell phone ex115 using the picture encoding method and the picture decoding method explained in the above-mentioned embodiments. The cell phone ex115 has an antenna ex201 for communicating with the cell site ex110 via radio waves, a camera unit ex203 such as a CCD camera capable of shooting moving and still pictures, a display unit ex202 such as a liquid crystal display for displaying the data such as decoded pictures and the like shot by the camera unit ex203 or received by the antenna ex201, a body unit including a set of operation keys ex204, an audio output unit ex208 such as a speaker for outputting audio, an audio input unit ex205 such as a microphone for inputting audio, a storage medium ex207 for storing coded or decoded data such as data of moving or still pictures shot by the camera, data of received e-mails and that of moving or still pictures, and a slot unit ex206 for attaching the storage medium ex207 to the cell phone ex115. The storage medium ex207 stores in itself a flash memory element, a kind of EEPROM (Electrically Erasable and Programmable Read Only Memory) that is a nonvolatile memory electrically erasable from and rewritable to a plastic case such as an SD card, or the like.

Next, the cell phone ex115 will be explained with reference to FIG. 22. In the cell phone ex115, a main control unit ex311, designed in order to control overall each unit of the main body which contains the display unit ex202 as well as the operation keys ex204, is connected mutually to a power supply circuit unit ex310, an operation input control unit ex304, a picture encoding unit ex312, a camera interface unit ex303, an LCD (Liquid Crystal Display) control unit ex302, a picture decoding unit ex309, a multiplexing/demultiplexing unit ex308, a read/write unit ex307, a modem circuit unit ex306, and an audio processing unit ex305 via a synchronous bus ex313.

When a call-end key or a power key is turned ON by a user's operation, the power supply circuit unit ex310 supplies respective units with power from a battery pack so as to activate the camera attached digital cell phone ex115 as a ready state.

In the cell phone ex115, the audio processing unit ex305 converts the audio signals received by the audio input unit ex205 in conversation mode into digital audio data under the control of the main control unit ex311 including a CPU, ROM and RAM, the modem circuit unit ex306 performs spread spectrum processing of the digital audio data, and the communication circuit unit ex301 performs digital-to-analog conversion and frequency transform of the data, so as to transmit it via the antenna ex201. Also, in the cell phone ex115, the communication circuit unit ex301 amplifies the data received by the antenna ex201 in conversation mode and performs frequency transform and analog-to-digital conversion to the data, the modem circuit unit ex306 performs inverse spread spectrum processing of the data, and the audio processing unit ex305 converts it into analog audio data, so as to output it via the audio output unit ex208.

Furthermore, when transmitting an e-mail in data communication mode, the text data of the e-mail inputted by operating the operation keys ex204 of the main body is sent out to the main control unit ex311 via the operation input control unit ex304. In the main control unit ex311, after the modem circuit unit ex306 performs spread spectrum processing of the text data and the communication circuit unit ex301 performs digital-to-analog conversion and frequency transform for the text data, the data is transmitted to the cell site ex110 via the antenna ex201.

When picture data is transmitted in data communication mode, the picture data shot by the camera unit ex203 is supplied to the picture encoding unit ex312 via the camera interface unit ex303. When it is not transmitted, it is also possible to display the picture data shot by the camera unit ex203 directly on the display unit ex202 via the camera interface unit ex303 and the LCD control unit ex302.

The picture encoding unit ex312, which includes the picture encoding apparatus as explained in the present invention, compresses and codes the picture data supplied from the camera unit ex203 by the encoding method used for the picture encoding apparatus as shown in the above-mentioned first embodiment so as to transform it into encoded picture data, and sends it out to the multiplexing/demultiplexing unit ex308. At this time, the cell phone ex115 sends out the audio received by the audio input unit ex205 during the shooting with the camera unit ex203 to the multiplexing/demultiplexing unit ex308 as digital audio data via the audio processing unit ex305.

The multiplexing/demultiplexing unit ex308 multiplexes the encoded picture data supplied from the picture encoding unit ex312 and the audio data supplied from the audio processing unit ex305 using a predetermined method, then the modem circuit unit ex306 performs spread spectrum processing of the multiplexed data obtained as a result of the multiplexing, and lastly the communication circuit unit ex301 performs digital-to-analog conversion and frequency transform of the data for the transmission via the antenna ex201.

As for receiving data of a moving picture file which is linked to a Web page or the like in data communication mode, the modem circuit unit ex306 performs inverse spread spectrum processing of the data received from the cell site ex110 via the antenna ex201, and sends out the multiplexed data obtained as a result of the inverse spread spectrum processing.

In order to decode the multiplexed data received via the antenna ex201, the multiplexing/demultiplexing unit ex308 separates the multiplexed data into an encoded stream of picture data and that of audio data, and supplies the encoded picture data to the picture decoding unit ex309 and the audio data to the audio processing unit ex305 respectively via the synchronous bus ex313.

Next, the picture decoding unit ex309, including the picture decoding apparatus as explained in the above-mentioned invention, decodes the encoded stream of picture data using the decoding method corresponding to the encoding method as shown in the above-mentioned embodiments to generate reproduced moving picture data, and supplies this data to the display unit ex202 via the LCD control unit ex302, and thus the picture data included in the moving picture file linked to a Web page, for instance, is displayed. At the same time, the audio processing unit ex305 converts the audio data into analog audio data, and supplies this data to the audio output unit ex208, and thus the audio data included in the moving picture file linked to a Web page, for instance, is reproduced.

Figure 23:
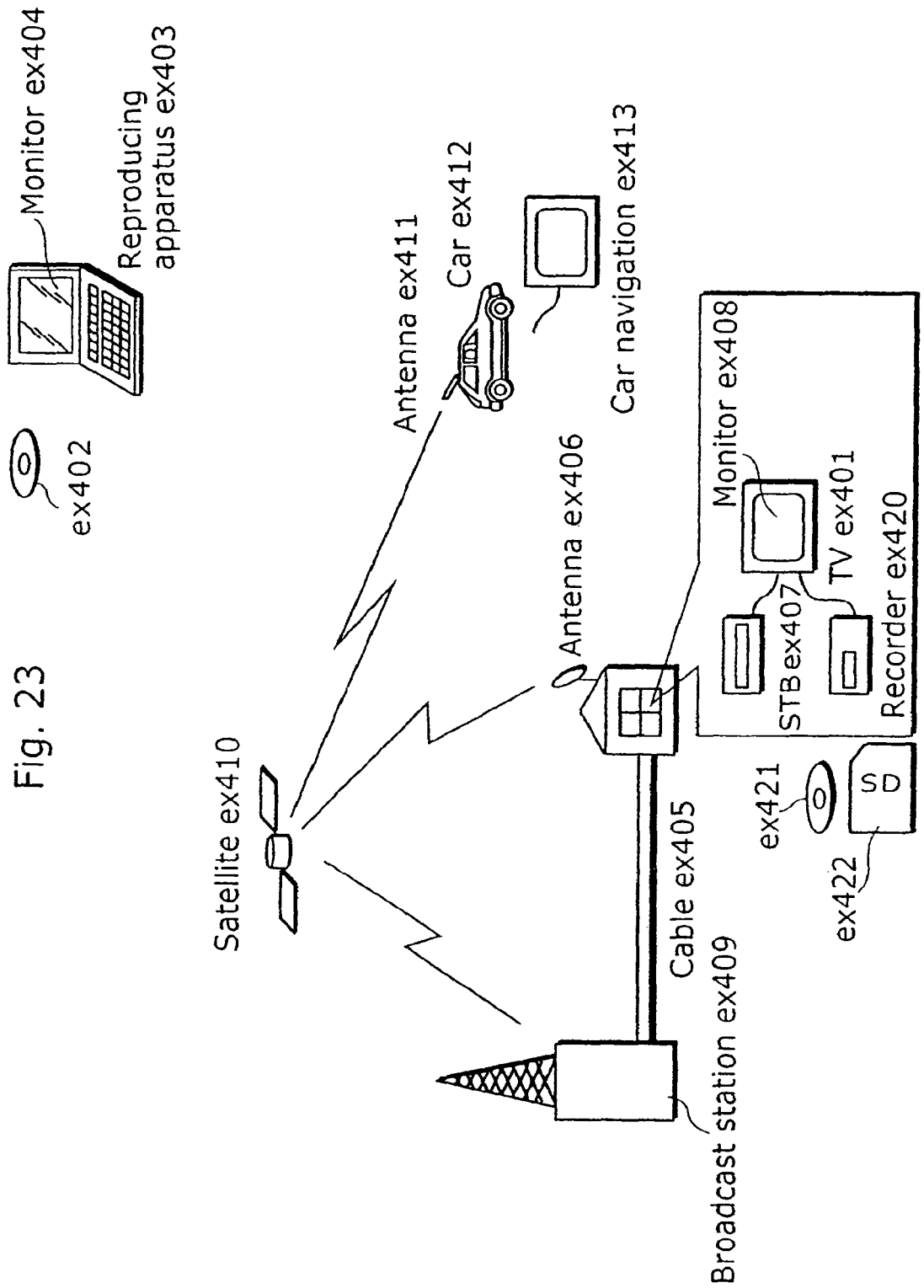
FIG. 23 is a block diagram showing an example of a digital broadcasting system described in the eighth embodiment.
Figure 25:
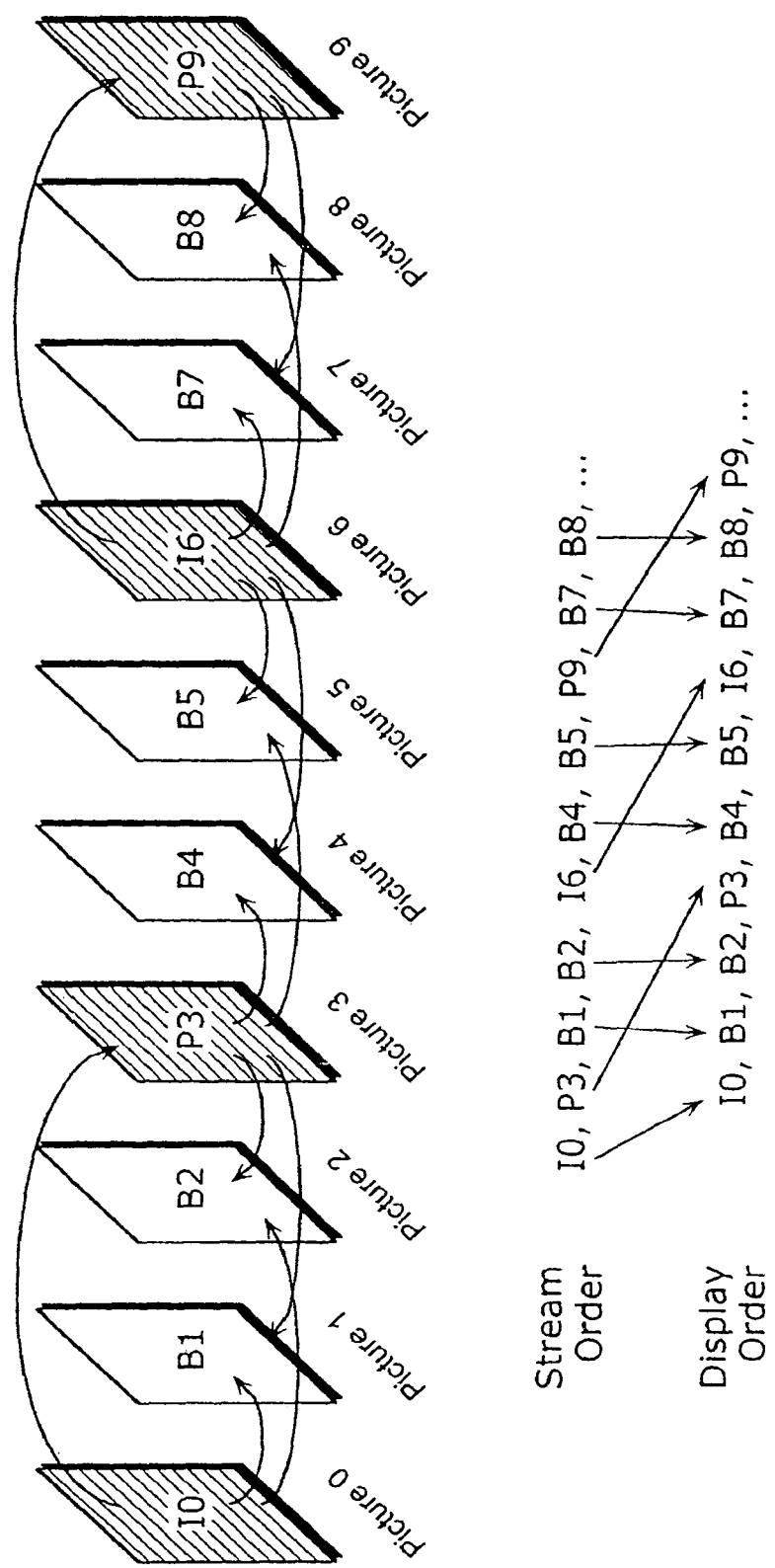
FIG. 25 is a diagram showing a prediction structure, a decoding order and a display order of the pictures.

The present invention is not limited to the above-mentioned system as such ground-based or satellite digital broadcasting has been in the news lately and at least either the picture encoding apparatus or the picture decoding apparatus described in the above-mentioned embodiments can be incorporated into a digital broadcasting system as shown in FIG. 23. More specifically, an encoded stream of video information is transmitted from a broadcast station ex409 to or communicated with a broadcast satellite ex410 via radio waves. Upon receipt of it, the broadcast satellite ex410 transmits radio waves for broadcasting. Then, a home-use antenna ex406 with a satellite broadcast reception function receives the radio waves, and a television (receiver) ex401 or a set top box (STB) ex407 decodes the encoded stream for reproduction. The picture decoding apparatus as shown in the above-mentioned embodiment can be implemented in a reproducing apparatus ex403 for reading out and decoding the encoded stream recorded on a storage medium ex402 that is a recording medium such as CD and DVD. In this case, the reproduced video signals are displayed on a monitor ex404. It is also conceivable to implement the picture decoding apparatus in the set top box ex407 connected to a cable ex405 for a cable television or the antenna ex406 for satellite and/or ground-based broadcasting so as to reproduce them on a monitor ex408 of the television ex401. The picture decoding apparatus may be incorporated into the television, not in the set top box. Also, a car ex412 having an antenna ex411 can receive signals from the satellite ex410 or the cell site ex107 for reproducing moving pictures on a display device such as a car navigation system ex413 set in the car ex412.

Furthermore, the picture encoding apparatus as shown in the above-mentioned embodiments can encode picture signals and record them on a recording medium. As a concrete example, a recorder ex420 such as a DVD recorder for recording picture signals on a DVD disk ex421, a disk recorder for recording them on a hard disk, or the like can be cited. They can be recorded on an SD card ex422. If the recorder ex420 includes the picture decoding apparatus as shown in the above-mentioned embodiments, the picture signals recorded on the DVD disk ex421 or the SD card ex422 can be reproduced for display on the monitor ex408.

Figure 22:
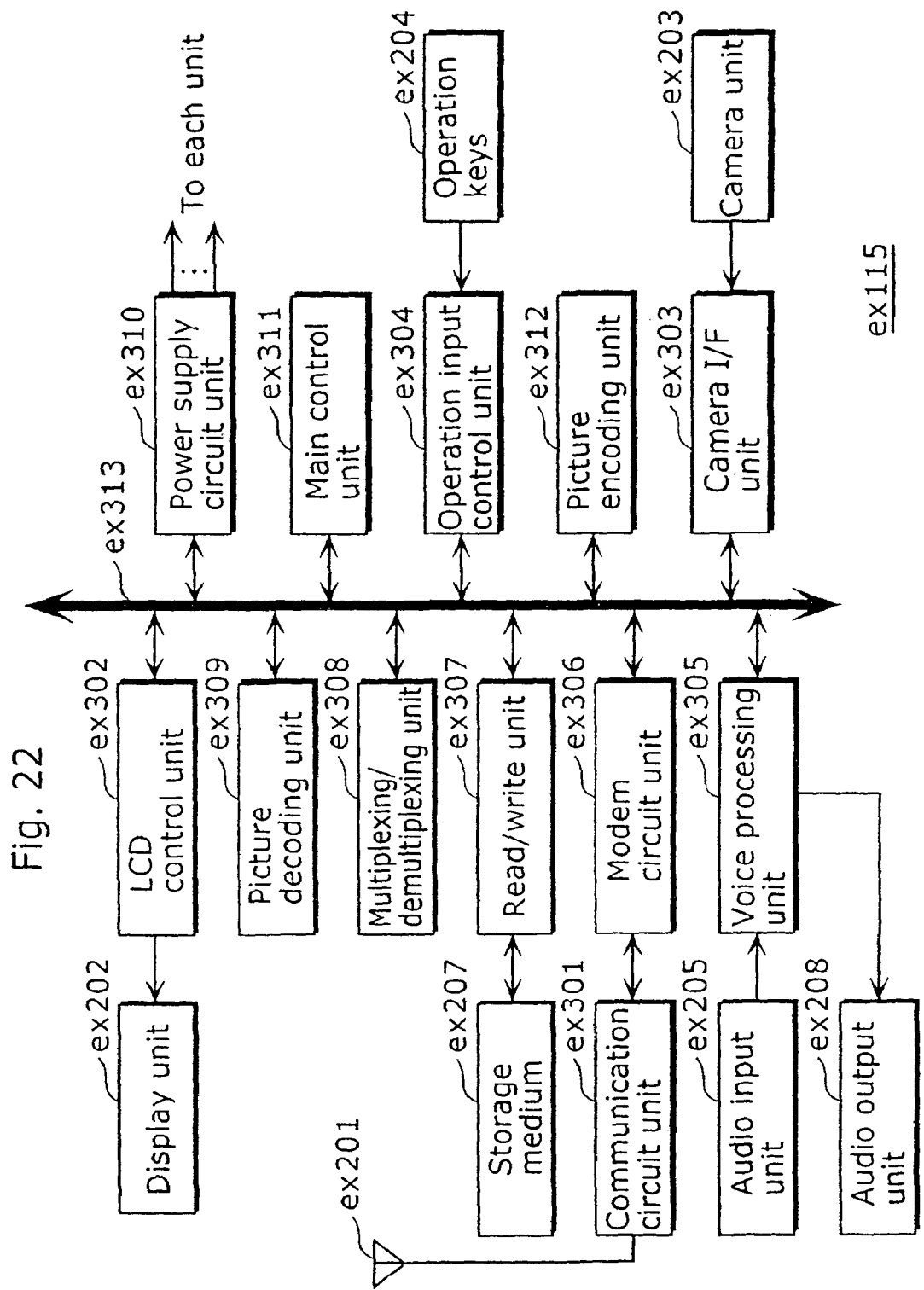
FIG. 22 is a block diagram of the cell phone.

As for the structure of the car navigation system ex413, the structure without the camera unit ex203, the camera interface unit ex303 and the picture encoding unit ex312, out of the components shown in FIG. 22, for example, is conceivable. The same applies for the computer ex111, the television (receiver) ex401 and others.

In addition, three types of implementations can be conceived for a terminal such as the above-mentioned cell phone ex114; a sending/receiving terminal implemented with both an encoder and a decoder, a sending terminal implemented with an encoder only, and a receiving terminal implemented with a decoder only.

As described above, it is possible to use the picture encoding method or the picture decoding method described in the above-mentioned embodiments for any of the above-mentioned devices and systems, and by thus doing, the effects described in the above-mentioned embodiments can be obtained.

Also, the present invention is not limited to the above-mentioned embodiments and a wide range of variations or modifications within the scope of the following claims are possible.

In the present embodiment, the term "display" means to output after reordering the order of the pictures into a display order. Namely, a process for outputting a decoded picture to a display device is described as "display". An operation of outputting the decoded picture in order to record it onto other recording device, for instance, applies to this special usage of "display". When the display device has a picture memory, it is possible to transmit the decoded picture to the display device earlier than the actual display time.

INDUSTRIAL APPLICABILITY

The present invention is used for a picture encoding apparatus for encoding a picture by a predictive encoding with reference to a decoded picture stored in a decoded picture buffer, decoding the encoded picture and storing the decoded picture in the decoded picture buffer and a picture encoding apparatus for decoding the picture encoded by a predictive encoding with reference to a decoded picture stored in a decoded picture buffer and storing the decoded picture in the decoded picture buffer.

The invention claimed is:

1. A picture decoding method for decoding a coded picture signal, the coded picture signal being generated by coding a picture in a moving picture composed of a plurality of pictures, the picture decoding method comprising:
   a decoding step of decoding the coded picture signal to obtain a decoded picture;
   a first judging step of judging if the decoded picture is a reference picture or a non-reference picture;
   a storing step of storing the decoded picture into a decoded picture buffer when the decoded picture is judged to be a reference picture in the first judging step;
   a third judging step of judging based on a display timing if the decoded reference picture in the decoded picture buffer is a picture to be outputted for display;
   an output step of outputting the decoded reference picture for display, based on the result of the third judging step;
   a fourth judging step of judging if the decoded reference picture stored in the decoded picture buffer is a picture which is no longer referred to;
   a buffer re-usable step of making an area of the decoded picture buffer in which the decoded picture is stored re-usable after the decoded picture stored in the decoded picture buffer has been outputted for display, based on the result of the fourth judging step; and
   a second judging step of judging if the decoded picture is a picture which is necessary to be stored in the decoded picture buffer until a display time when the decoded picture is judged to be a non-reference picture in the first judging step,
   wherein
   said storing step further comprises storing the decoded picture into the area of the decoded picture buffer, when the decoded picture is judged to be a non-reference picture which is necessary to be stored in the decoded picture buffer until a time of display,
   said third judging step further comprises judging based on a display timing if the decoded non-reference picture stored in the decoded picture buffer is a picture to be outputted for display, prior to one or more decoded pictures stored in the decoded picture buffer, and
   said buffer re-usable step further comprises making the area of the decoded picture buffer re-usable after the decoded non-reference picture stored in the decoded picture buffer has been outputted for display based on the result of the third judging step.

* * * * *